(12) United States Patent
Sudoh

(10) Patent No.: US 12,411,343 B2
(45) Date of Patent: Sep. 9, 2025

(54) OPTICAL SYSTEM, VIRTUAL IMAGE DISPLAY DEVICE, AND HEAD-MOUNTED DISPLAY

(71) Applicant: Yoshifumi Sudoh, Kanagawa (JP)

(72) Inventor: Yoshifumi Sudoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 110 days.

(21) Appl. No.: 18/219,098

(22) Filed: Jul. 7, 2023

(65) Prior Publication Data
US 2024/0019699 A1 Jan. 18, 2024

(30) Foreign Application Priority Data
Jul. 13, 2022 (JP) .................................. 2022-112126

(51) Int. Cl.
*G02B 27/01* (2006.01)
*F21V 8/00* (2006.01)
*G02B 27/02* (2006.01)
*G02B 27/14* (2006.01)

(52) U.S. Cl.
CPC ........ *G02B 27/0172* (2013.01); *G02B 6/0031* (2013.01); *G02B 6/0055* (2013.01); *G02B 27/025* (2013.01); *G02B 27/144* (2013.01); *G02B 27/145* (2013.01); *G02B 2027/0178* (2013.01)

(58) Field of Classification Search
CPC ........ G02B 2027/0178; G02B 27/0172; G02B 27/025; G02B 27/144; G02B 27/145; G02B 6/0031; G02B 6/0055
See application file for complete search history.

(56) References Cited

U.S. PATENT DOCUMENTS

| | | | |
|---|---|---|---|
| 2005/0018309 A1* | 1/2005 | McGuire, Jr. ...... | G02B 27/0081 359/630 |
| 2006/0250696 A1* | 11/2006 | McGuire .............. | G02B 27/149 359/630 |
| 2016/0178909 A1* | 6/2016 | Komatsu ................ | G02B 13/18 345/8 |
| 2017/0285347 A1 | 10/2017 | Cai et al. | |
| 2018/0067320 A1* | 3/2018 | Komatsu ................ | G02B 13/18 |
| 2019/0204600 A1 | 7/2019 | Ha et al. | |
| 2019/0227322 A1* | 7/2019 | Schaub .............. | G02B 26/0816 |
| 2021/0165221 A1 | 6/2021 | Hasegawa et al. | |

(Continued)

FOREIGN PATENT DOCUMENTS

| | | |
|---|---|---|
| JP | 2021-086052 | 6/2021 |
| JP | 2021-149006 | 9/2021 |

(Continued)

*Primary Examiner* — Dmitriy Bolotin
(74) *Attorney, Agent, or Firm* — XSENSUS LLP

(57) ABSTRACT

An optical system includes: a first optical portion, on which image light from an image display element is incident; a light guide configured to guide the image light incident from the first optical portion; and a second optical portion configured to direct the image light guided in the light guide to an object. The first optical portion has an anamorphic surface having: a first shape in a first direction; and a second shape in a second direction different from the first direction, the first shape being different from the second shape. The first optical portion forms an intermediate image of the image light.

20 Claims, 21 Drawing Sheets

(56) References Cited

U.S. PATENT DOCUMENTS

| | | |
|---|---|---|
| 2021/0325677 A1* | 10/2021 | Gao .................. G02B 27/0093 |
| 2022/0026716 A1 | 1/2022 | Sudoh et al. |
| 2022/0057640 A1 | 2/2022 | Nakamura et al. |
| 2022/0252838 A1 | 8/2022 | Sudoh et al. |
| 2023/0003931 A1 | 1/2023 | Nakamura et al. |
| 2023/0039870 A1 | 2/2023 | Momma et al. |
| 2023/0088184 A1 | 3/2023 | Sudoh |

FOREIGN PATENT DOCUMENTS

| | | |
|---|---|---|
| JP | 2022-020912 | 2/2022 |
| JP | 2022-024648 | 2/2022 |
| JP | 2022-190206 | 12/2022 |
| JP | 2023-003775 | 1/2023 |

* cited by examiner

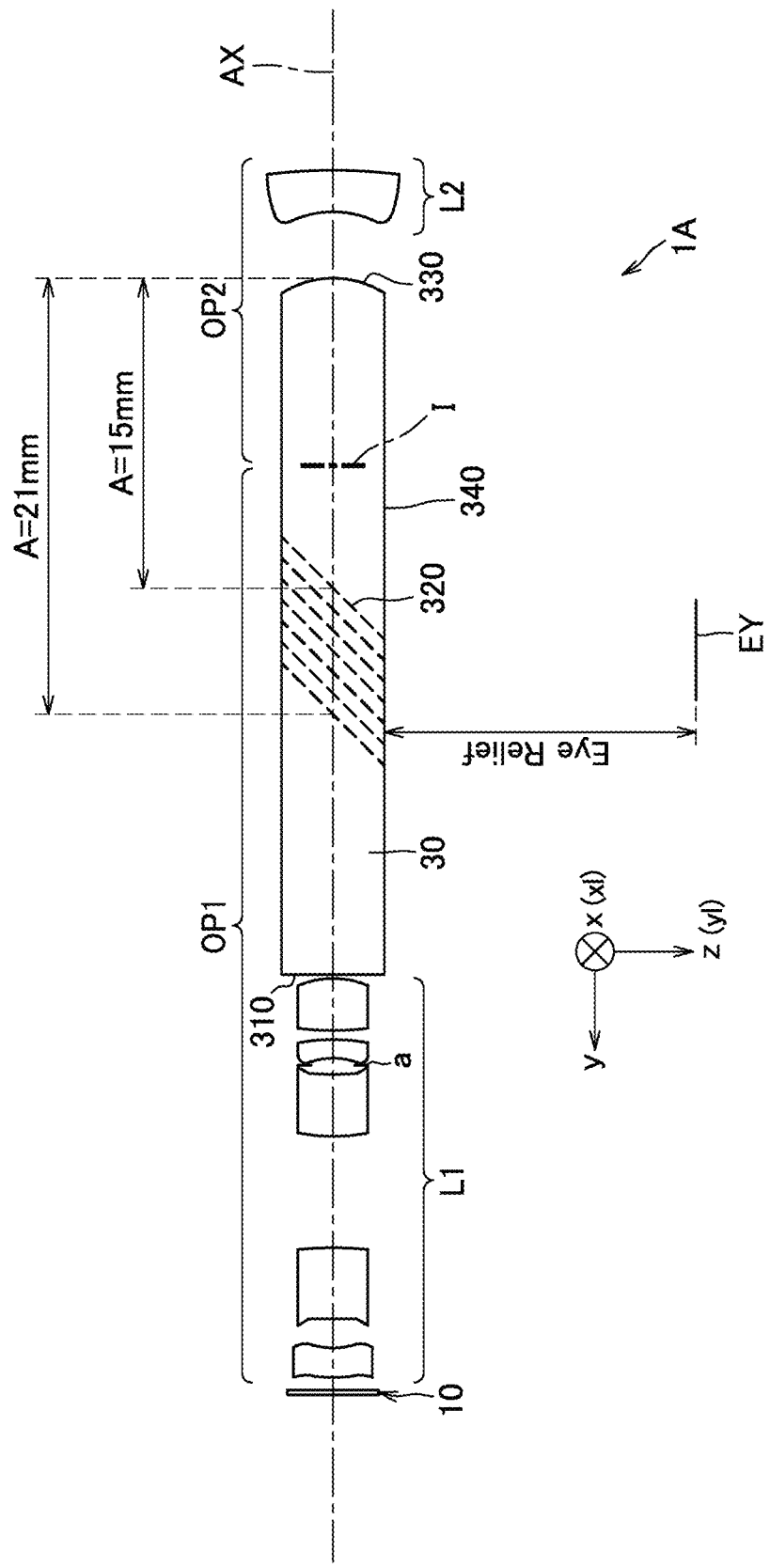

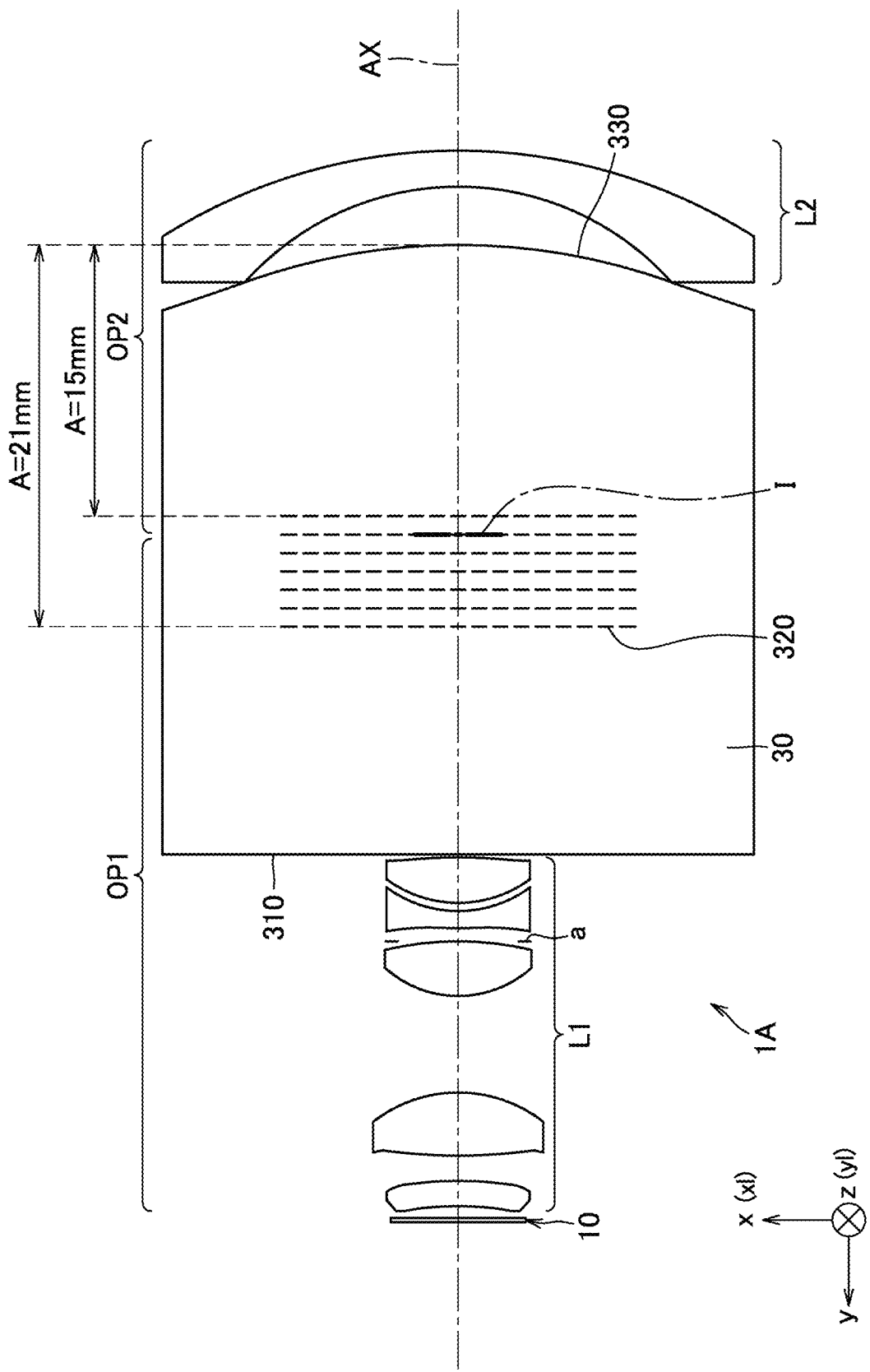

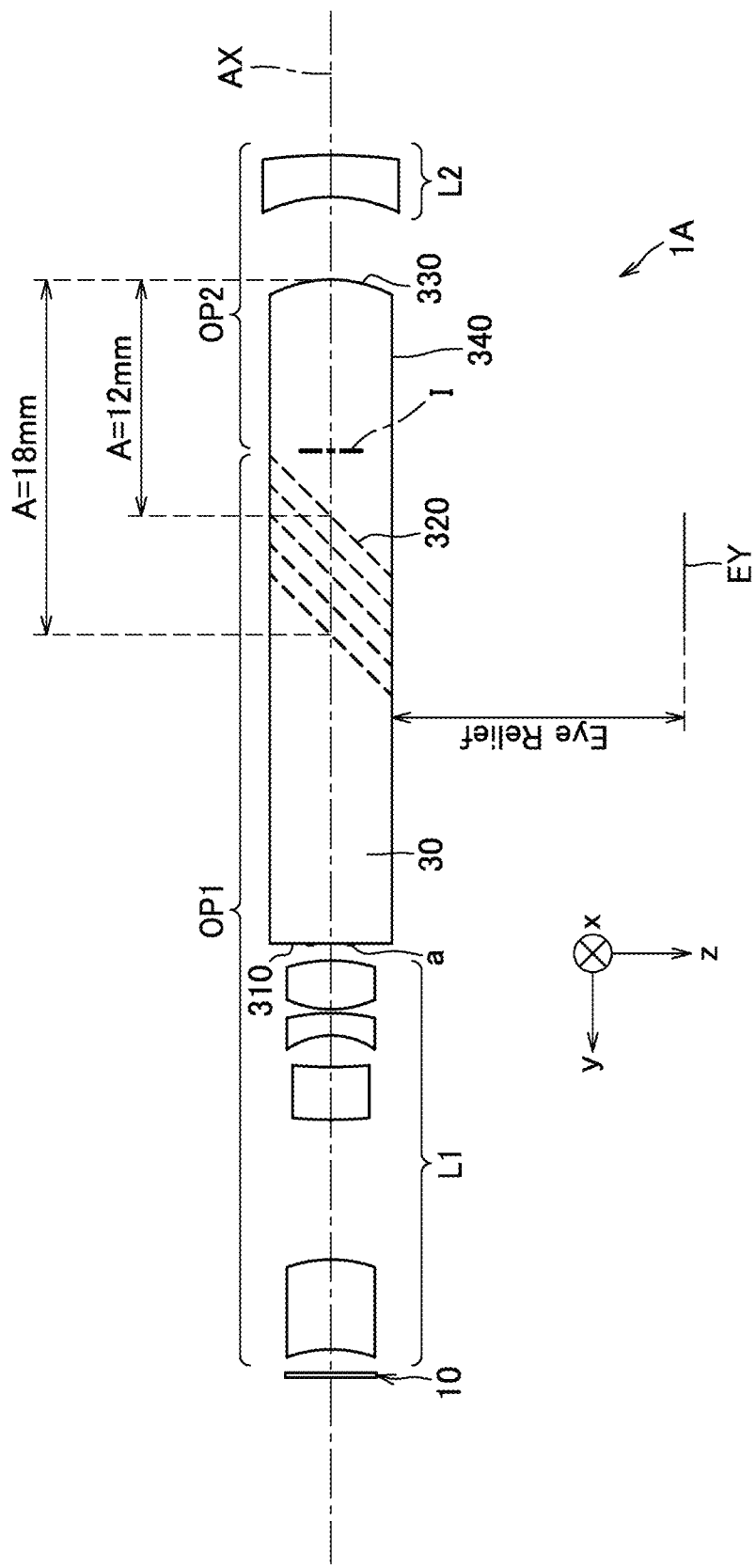

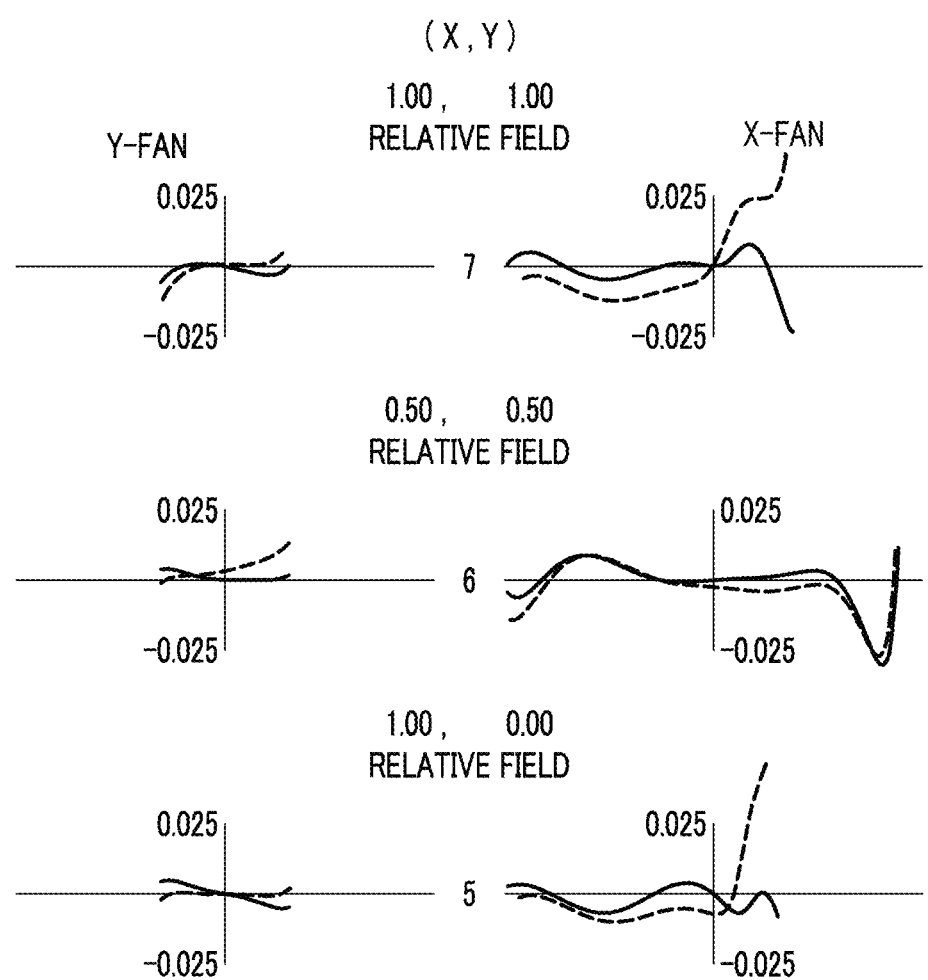

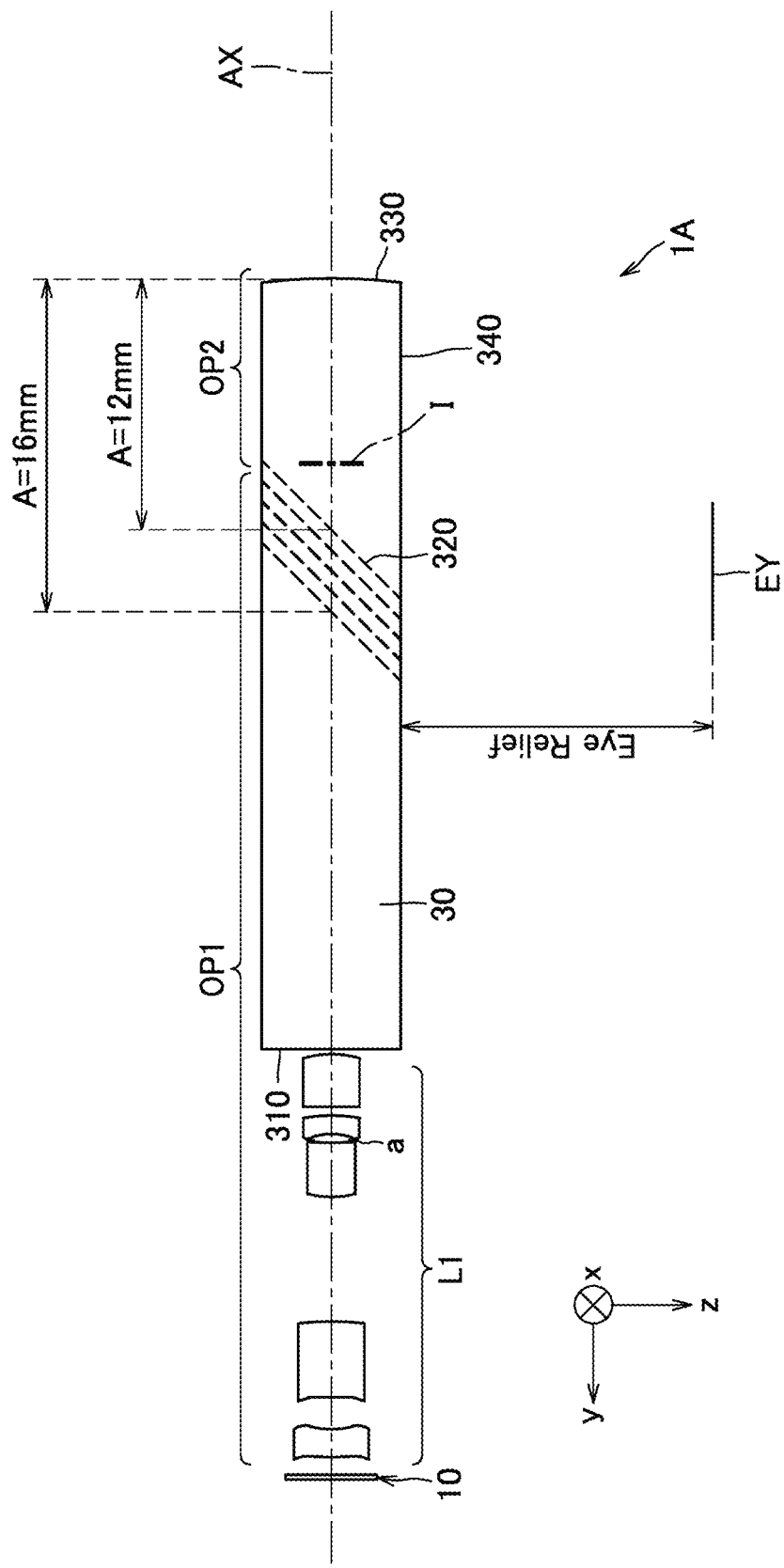

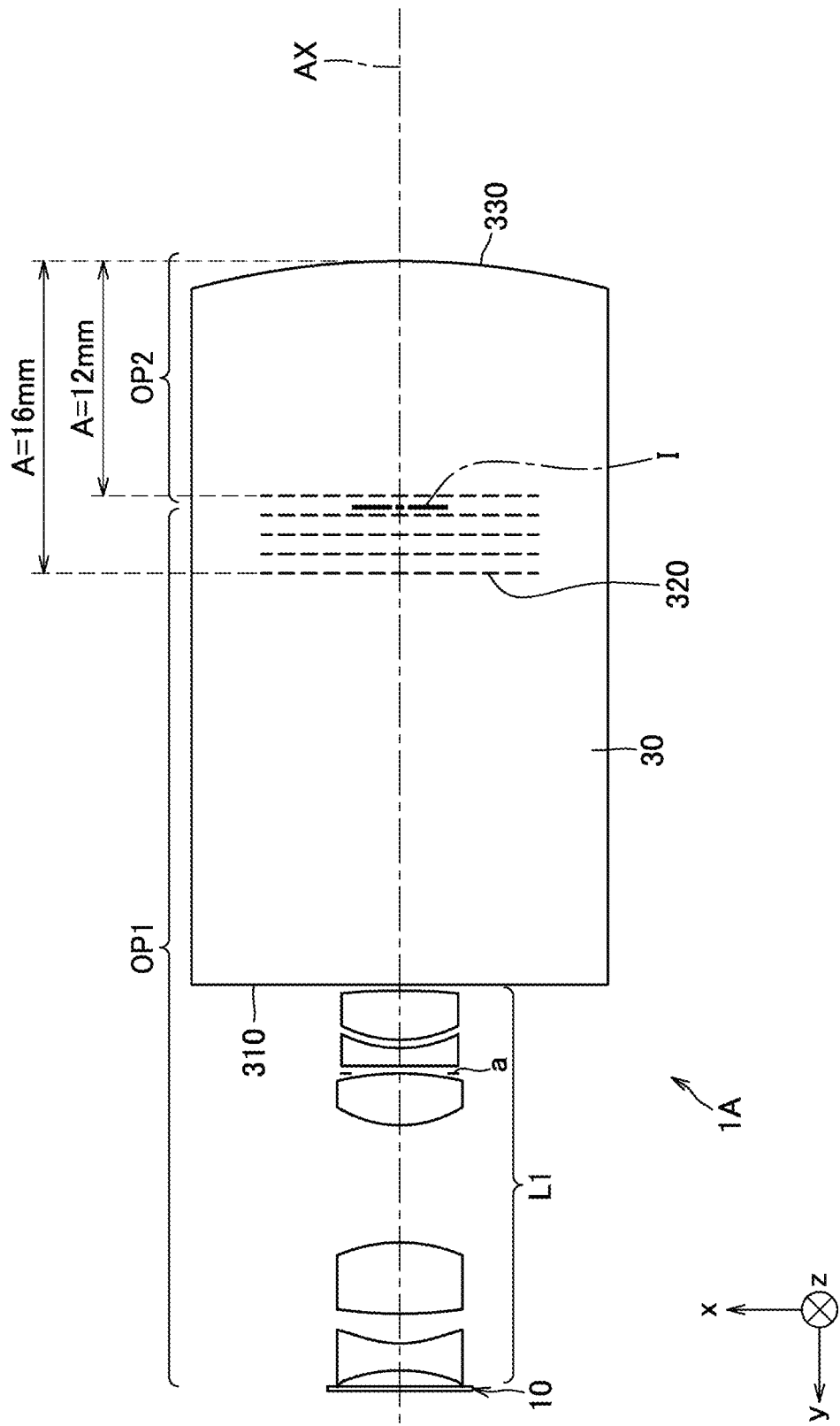

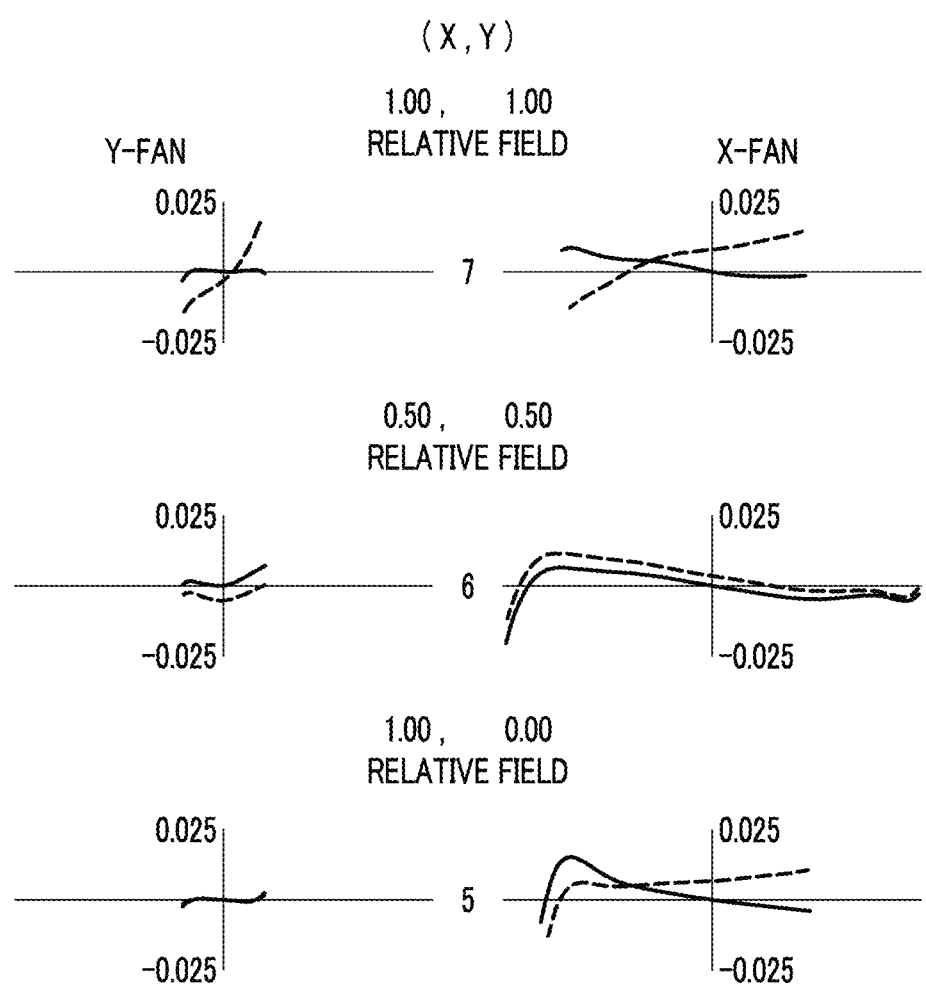

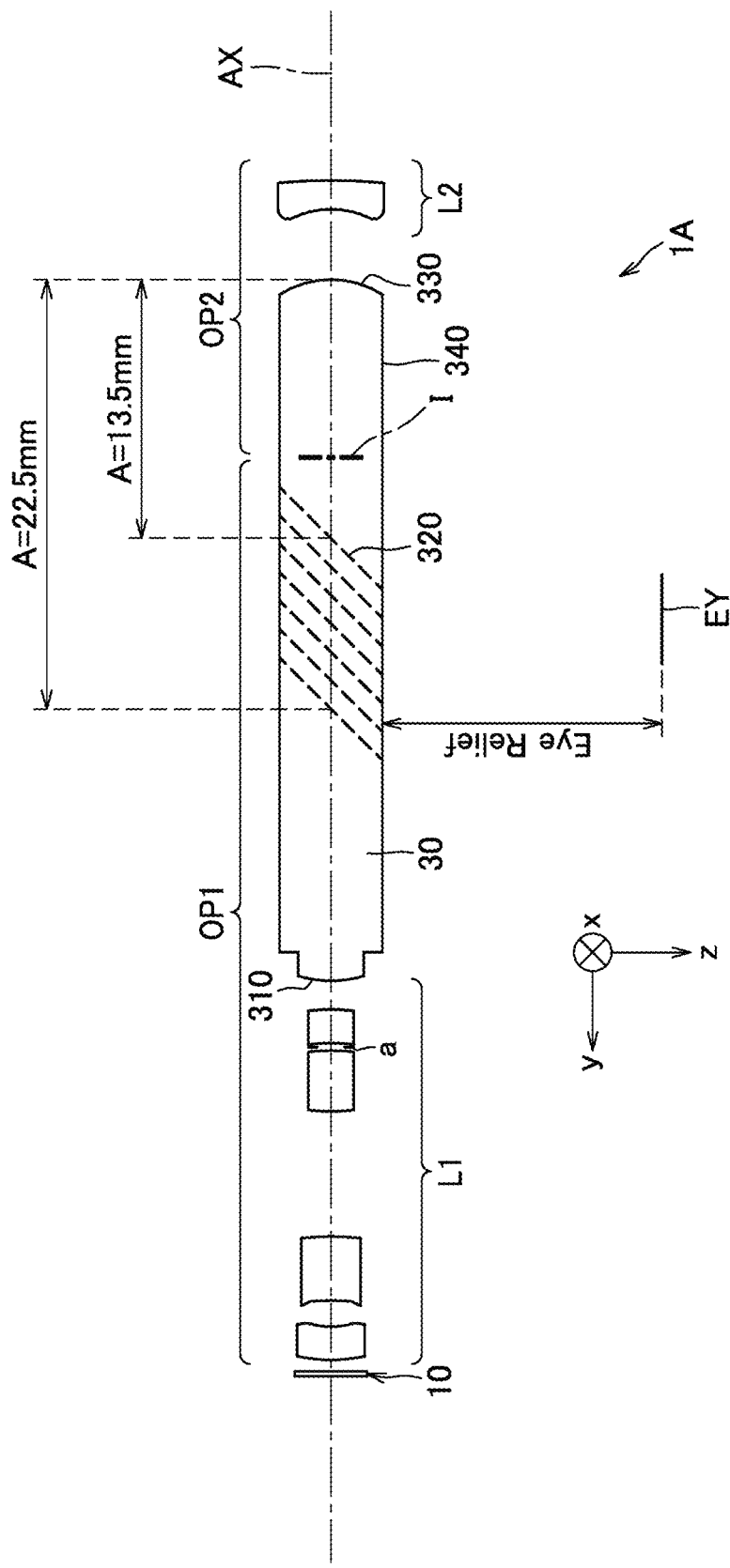

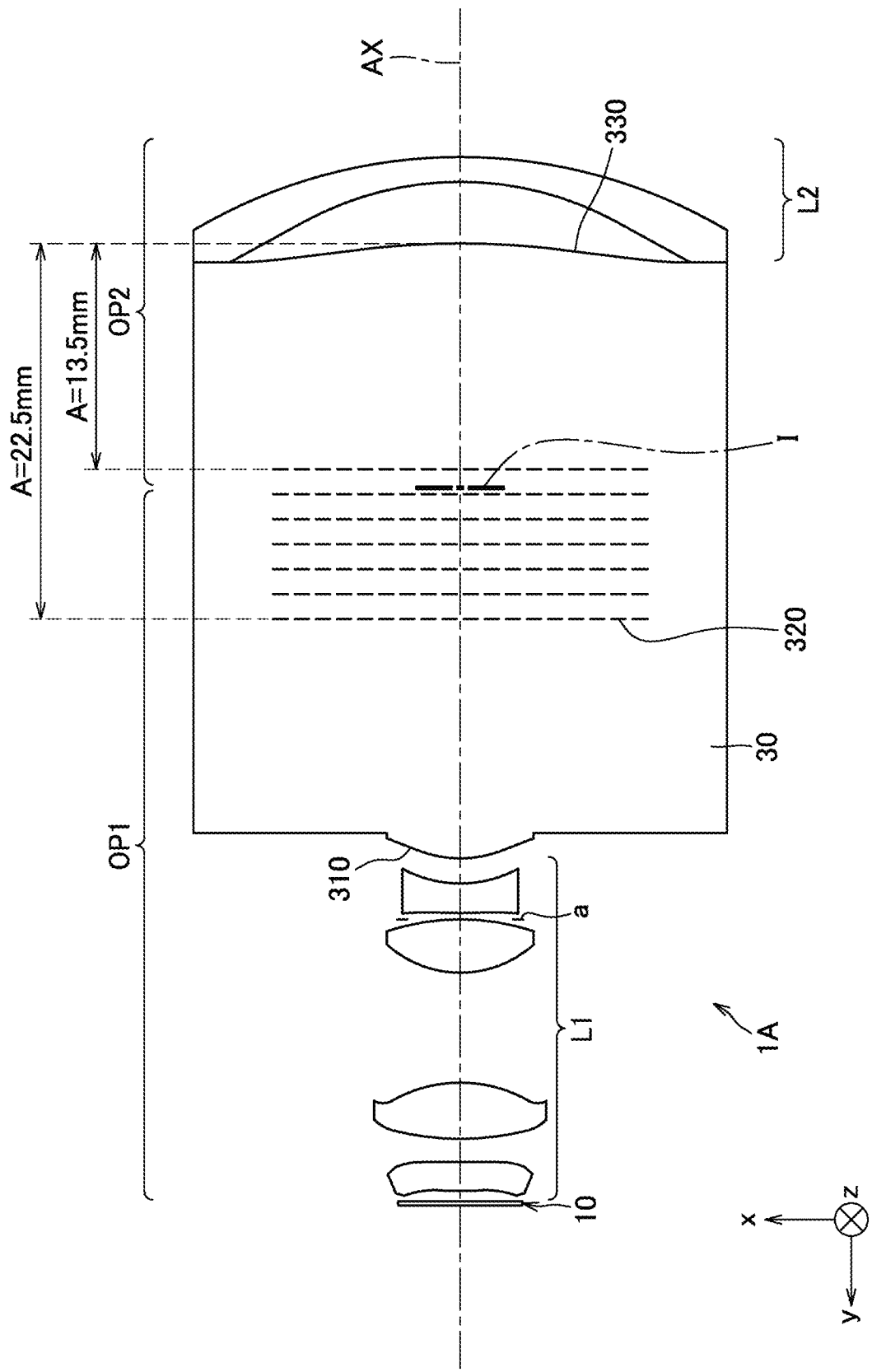

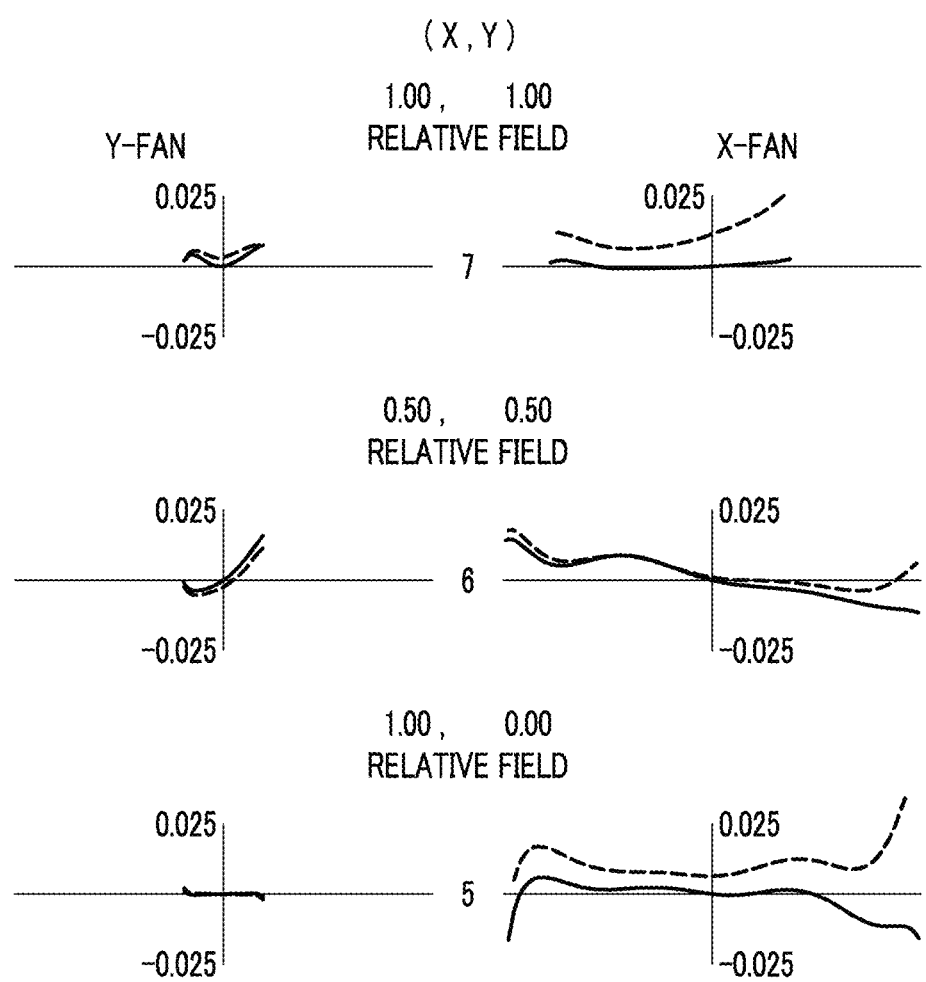

OPTICAL SYSTEM, VIRTUAL IMAGE DISPLAY DEVICE, AND HEAD-MOUNTED DISPLAY

CROSS-REFERENCE TO RELATED APPLICATIONS

This patent application is based on and claims priority pursuant to 35 U.S.C. § 119(a) to Japanese Patent Application No. 2022-112126, fled on Jul. 13, 2022, in the Japan Patent Office, the entire disclosure of which is hereby incorporated by reference herein.

BACKGROUND

Technical Field

The present disclosure relates to an optical system, a virtual image display device, and a head-mounted display.

Related Art

Virtual image display devices have been developed for displaying an enlarged two-dimensional virtual image to an observer.

A virtual image display device is, for example, a glass device with an image display element embedded in its frame. The virtual image display device, for example, allows light (i.e., image light, or light containing image information) emitted from the image display element to proceed through a lens and emits the image light toward an observer, or a user. This allows the observer to observe an enlarged virtual image formed with the emitted image light.

In the virtual image display device, collimated light is caused to proceed through the lens serving as a light guide component. This configuration makes it difficult to reduce the thickness of the lens.

SUMMARY

An embodiment of the present disclosure provides an optical system including: a first optical portion, on which image light from an image display element is incident; a light guide configured to guide the image light incident from the first optical portion; and a second optical portion configured to direct the image light guided in the light guide to an object. The first optical portion has an anamorphic surface having: a first shape in a first direction; and a second shape in a second direction different from the first direction, the first shape being different from the second shape. The first optical portion forms an intermediate image of the image light.

An embodiment of the present disclosure provides a virtual image display device including: the optical system described above; and the image display element configured to emit image light to the optical system.

An embodiment of the present disclosure provides a head-up display including the virtual image display device described above.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6A is a diagram of an optical configuration of a virtual image display device according to Numerical Example 1;

FIG. 6B is another diagram of the optical configuration of a virtual image display device according to Numerical Example 1;

FIG. 9A is a diagram of an optical configuration of a virtual image display device according to Numerical Example 2;

FIG. 10B is another lateral aberration diagram of the virtual image display device according to Numerical Example 2;

FIG. 11A is a diagram of the optical configuration of a virtual image display device according to Numerical Example 3;

FIG. 11B is another diagram of the optical configuration of the virtual image display device according to Numerical Example 3;

FIG. 12B is another lateral aberration diagram of the virtual image display device according to Numerical Example 3;

FIG. 13A is a diagram of the optical configuration of a virtual image display device according to Numerical Example 4;

FIG. 13B is another diagram of the optical configuration of the virtual image display device according to Numerical Example 4;

FIG. 14B is another lateral aberration diagram of the virtual image display device according to Numerical Example 4.

Figure 1:
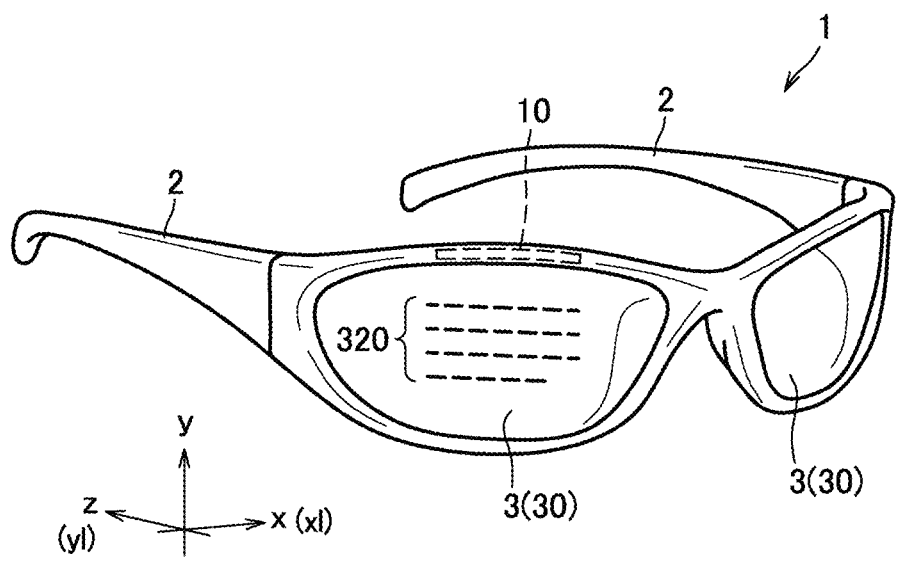
FIG. 1 is an illustration of a head-mounted display incorporating a virtual display device according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure provide an optical system for a virtual image device, which allows a reduction in the thickness of a light guide that guides image light, a virtual image display device, and a head-mounted display incorporating the optical system.

Hereinafter, an optical system for a virtual image display device according to an embodiment, a virtual image display device, and a head-mounted display are described with reference to the drawings. In the following description, common or corresponding elements are denoted by the same or similar reference signs, and redundant description is appropriately simplified or omitted.

FIG. 1 is an illustration of a head-mounted display incorporating a virtual display device according to an embodiment of the present disclosure. In the present embodiment, a head-mounted display 1 is, for example, smartglasses that serve as a glasses-type wearable terminal. The smartglasses may be referred to as a glass device or a glass display.

Examples of the head-mounted display 1 includes a virtual reality (VR) glasses, augmented reality (AR) Glasses, mixed reality (MR) Glasses, extended reality (XR) glasses, which are all wearable terminals.

In FIG. 1, the head-mounted display 1 is a binocular head-mounted display. In another embodiment, the head-mounted display 1 may be a monocular head-mounted display corresponding to one of the left and right eyes.

As illustrated in FIG. 1, the head-mounted display 1 includes a frame portion 2 and a lens portion 3. The lens portion 3 is fitted into the frame portion 2. A pair of lens portions 3 is disposed corresponding to the left and right eyes of the wearer.

An image display element 10 for displaying an image is built in the frame portion 2. In FIG. 1, the image display element 10 is embedded in a portion of the frame portion 2 covering the upper edge of the lens portion 3. The installation position of the image display element 10 is not limited to the position illustrated in FIG. 1. Alternatively, the image display element 10 may be embedded in a portion of the frame portion 2 covering the lower edge of the lens portion 3.

The image display element 10 displays an image to be recognized as a virtual image. Examples of the image display element 10 include an organic light emitting diode (OLED) array, a laser diode (LD) array, a light emitting diode (LED) array, micro electro mechanical systems (MEMS), and a digital micromirror device (DMD).

In the following description, a z-direction in FIG. 1 is referred to as a first horizontal direction from the lens portion 3 to the eyes of the wearer (a user), an x-direction in FIG. 1 is referred to as a second horizontal direction orthogonal to the z-direction, and a y-direction in FIG. 1 is referred to as a vertical direction orthogonal to each of the x-direction and the z-direction. The x-direction, the y-direction, and the z-direction orthogonal to each other form a left-handed system.

The term "direction" is used for convenience to describe the relative position between the components, and does not indicate an absolute direction. Depending on the posture of the user wearing the head-mounted display 1, for example, the z-direction may not be the horizontal direction and may be the vertical direction.

Light rays (i.e., image light) emitted from the respective pixels of the image display element 10 are emitted from the image display element 10 in the −y-direction to enter the lens portions 3 and proceed through the lens portions 3. Thereafter, the light rays are emitted from the lens portions 3 in the +z-direction (i.e., to the eyes of the wearer) for display of a virtual image. In other words, the pair of lens portions 3 each forms an eye box in a region including the corresponding eye.

Figure 2A:
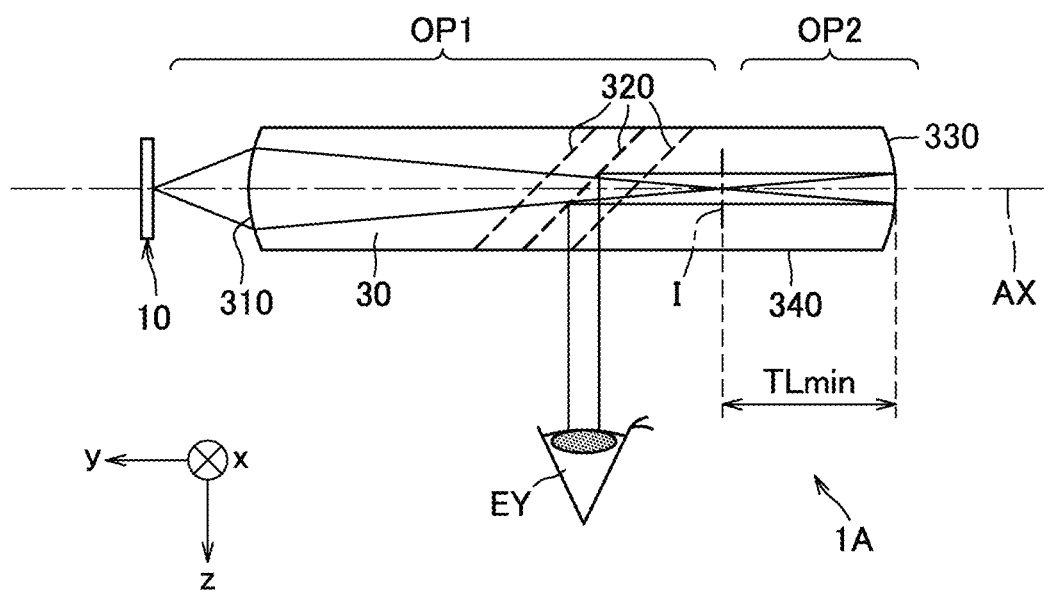
FIG. 2A is a diagram of the configuration of a virtual image display device according to an embodiment of the present disclosure.
Figure 2B:
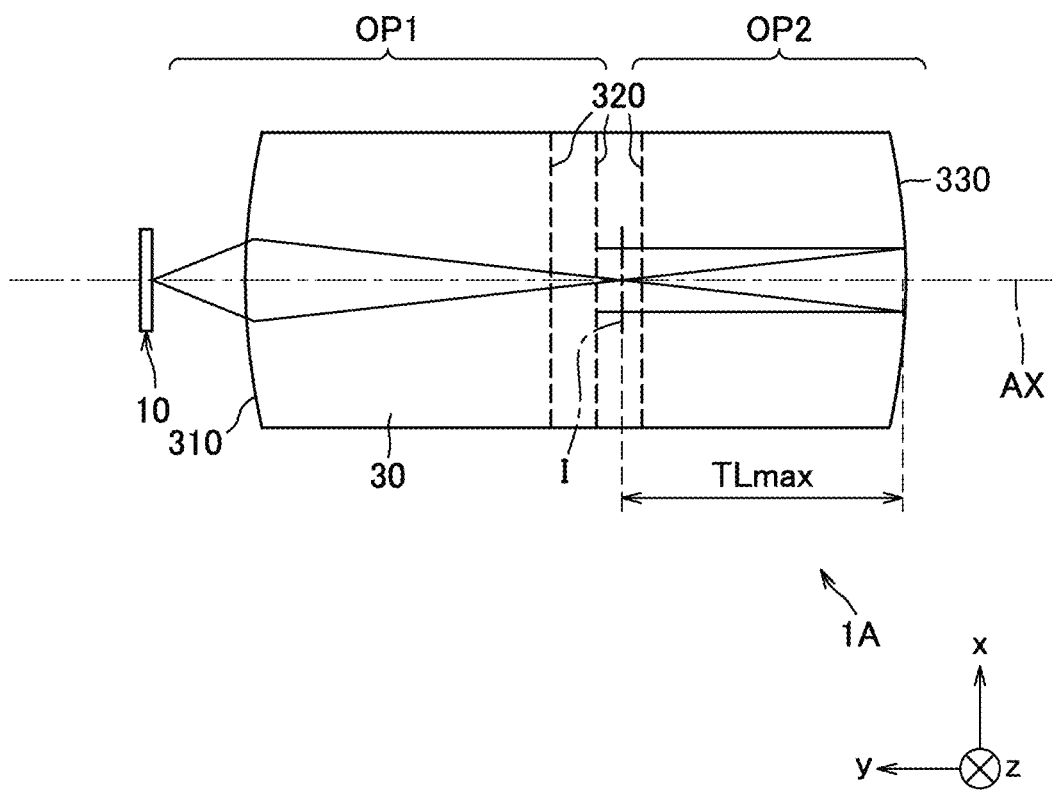
FIG. 2B is a diagram of the configuration of a virtual image display device according to an embodiment of the present disclosure.

FIGS. 2A and 2B are diagrams of the configuration of a virtual image display device 1A according to an embodiment of the present disclosure. FIG. 2A is an illustration of a yz cross section (a cross-sectional plane including the optical axis AX) of the image display element 10 and one lens portion 3. FIG. 2B is an illustration of an xy cross section (a cross-sectional plane including the optical axis AX) of the image display element 10 and one lens portion 3.

The virtual image display device 1A is, for example, mounted on the head-mounted display 1.

The virtual image display device 1A according to the present embodiment may be mounted on a device other than the head-mounted display. As an example, the virtual image display device 1A is mounted on a head-up display.

The virtual image display device 1A includes an image display element 10 and an optical system for the virtual image display device. In FIGS. 2A and 2B, the virtual image display device 1A includes an image display element 10 and a light guide 30. In FIG. 2, the left or right eye EY of the wearer is illustrated.

As will be described in detail later, the intermediate image I is formed in the light guide 30. In the optical system for a virtual image display device, an optical portion located before the intermediate image I is a first optical portion OP1, and another optical portion located after the intermediate image I is a second optical portion OP2.

In the virtual image display device 1A as illustrated in FIGS. 2A and 2B, an optical portion located before the intermediate image I is a first optical portion OP1, and another optical portion located after the intermediate image I is a second optical portion OP2.

As indicated by numerical examples to be described later, one or more optical element other than the light guide 30 may be included in the first optical portion OP or the second optical portion OP2.

The first optical portion OP1 includes an anamorphic surface having a first shape in a first direction and a second shape in a second direction different from the first direction, the first shape being different from the second shape. Image light, i.e., light containing information about image, from the image display element 10 enters the lens portion 3 through the first optical portion OP1.

The light guide 30 is an optical component that guides the image light entered through the first optical portion OP1 from the image display element 10. In the virtual image display device 1A mounted on the head-mounted display 1, the lens portions 3 corresponds to the light guide 30.

The light guide 30 has a first surface 310 (incident surface) on which the image light from the image display element 10 strikes. In the examples of FIGS. 2A and 2B, the first surface 310 is an anamorphic surface included in the first optical portion OP1.

The intermediate image I of the image light is formed in the light guide 30 by the first surface 310 having anamorphic power included in the first optical portion OP1, having the first magnification in the first direction (i.e., the z-direction in the present embodiment) and at the second magnification in the second direction (i.e., the x-direction in the present embodiment).

Among the absolute values of the magnifications of the intermediate image I, the absolute value of the first magnification in the z-direction (the first direction) is minimum, and the absolute value of the second magnification in the x-direction (the second direction) is maximum. In other words, the size of the intermediate image I formed in the light guide 30 is the smallest in the z-direction and largest in the x-direction.

In the virtual image display device 1A mounted on the head-mounted display 1, the light guide 30 defining the lens portion 3 has a thickness direction in the z-direction (the first direction). In this configuration, the light guide 30 is formed to be thinnest in the first direction. Although details will be described later, in the present embodiment, the size of the intermediate image I formed in the light guide 30 is reduced in the z-direction. This achieves a reduction in the thickness of the light guide 30.

As illustrated in Numerical Examples 1 to 4 described later, the first optical portion OP1 may be formed by multiple optical elements. This configuration allows the first optical portion OP1 to correct aberrations and thus allows the successful correction of various aberrations.

In the light guide 30, a partial reflector 320 is disposed to split the image light entered through the first surface 310 of the light guide 30, into reflected light and transmitted light.

The partial reflector 320 transmits a part (some rays) of image light guided to proceed in the −y-direction in the light guide 30 (i.e., image light guided from a first portion in which the first optical portion OP1 is located within the light guide 30). The partial reflector 320 reflects in the z-direction, a part (some rays) of the image light guided to proceed in the +y-direction in the light guide 30 (i.e., the image light guided from a second portion different from the first portion in the light guide 30) and causes the reflected light to exit from a third surface 340 (i.e., an exit surface) of the light guide 30.

For example, multiple partial reflectors 320 are disposed at predetermined intervals along the optical axis AX in the light guide 30. In the present embodiment, the optical axis AX is defined as an optical path of light proceeding from the center of the effective pixel area of the image display element 10 in a direction perpendicular to the pixel array surface. The optical axis AX is also an optical axis of the virtual image display device 1A, and is also an optical axis of each of optical components (for example, the light guide 30) included in the optical system for the virtual image display device 1A.

The image light is split into multiple light beams by the multiple partial reflectors 320, so that the eye box is enlarged and the angle of view is also enlarged. This allows the wear to visually identify the virtual image easily and also a virtual image with a wide angle of view, irrespective of the movement of the eye EY relative to the virtual image display device 1A.

With the partial reflectors 320 spaced too closely, for example, non-uniformity in light amount (or non-uniformity in the luminance of a virtual image) is more likely to occur because image light that has reflected off a first partial reflector 320 further reflects off a second partial reflector 320 adjacent to the first partial reflector 320. By contrast, with the partial reflectors 320 spaced too largely, for example, the virtual image appears partially missing depending on a location within the eye box. In view of such circumstances, the partial reflectors 320 are preferably spaced with an appropriate interval.

The partial reflector 320 is oriented to allow the image light to form a predetermined angle (e.g., an angle of 45 degrees) relative to the optical axis AX (or the third surface 340 from which the image light is emitted in the +z-direction). The partial reflector 320 is, for example, a semi-reflective mirror. The partial reflector 320 may be a polarizing beam splitter (PBS).

The partial reflector 320 is composed of, for example, a partial reflection surface formed in a plane. Such a configuration with the partial reflector 320 formed in a plane increases the ease of manufacture.

In FIG. 2, the light guide 30 includes multiple optical blocks (a first optical block and a second block). The first optical block has a partial reflection surface (i.e., a partial reflector 320) formed on its inclined surface. The inclined surface on which the partial reflection surface is formed in the first optical block is bonded to the inclined surface of the second optical block (on which the partial reflection surface is not formed) to form the light guide 30.

Each of the partial reflection surfaces is composed of a deposited film formed by depositing a metal material, for example. To increase the degree of adhesion between the optical blocks, a primer layer may be formed on the inclined surface of the optical block before forming the partial reflection surface on the primer layer.

Each optical block of the light guide 30 is a molding made of synthetic resin such as plastic. The light guide 30 made of such resin is lightweight. With a decrease in the weight of the light guide 30, the load on the nose of the wearer (the user) decreases. For this reason, the wearer can continue wearing the head-mounted display 1 for a long time without getting fatigued.

As illustrated in Numerical Examples 1 to 4 described later, the first optical portion OP1 may be configured to include an aperture stop on the optical path of the image light. The aperture stop allows substantially only image light having its aberration corrected, to enter the light guide 30. From another point of view, unnecessary light whose aberration is not corrected can be cut by the aperture stop. This reduces the occurrence of flare and enables a higher image quality.

Further, the aperture stop with an appropriately set size allows a depth of field sufficient to achieve the intended performance and enables higher resolution.

The shape of the aperture stop may be circular or rectangular, and multiple aperture stops a may be arranged in a direction perpendicular to the optical axis AX. Such multiple small apertures provide an eye box and allow a virtual image with a wide depth of field.

The second optical portion OP2 allows image light proceeding in the light guide 30 to be directed to a target object, which is the eyes EY of the wearer in the present embodiment. The second optical portion OP2 is opposite to the first optical portion OP1 (the first portion of the light guide 30) across the partial reflectors 320. In other words, the second optical portion OP2 is at a second portion opposite to the first portion of the light guide 30. The second optical portion OP2 reflects the image light transmitted through the partial reflectors 320 to the partial reflectors 320.

In the light guide 30, the second optical portion OP2 includes a second surface 330 opposed to the first surface 310. The image light entered through the first surface 310 and transmitted through the partial reflectors 320 is guided to reach the second surface 330.

The second surface 330 of the light guide 30 is a reflection surface that reflects the image light transmitted through the partial reflectors 320 toward the partial reflectors 320. Thus, the image light that has reached the second surface 330 is directed in the +y-direction toward the partial reflectors 320.

The second optical portion OP1 includes an anamorphic surface having a magnification in the first direction and another magnification in the second direction different from the first direction. In the examples illustrated in FIGS. 2A and 2B, the second surface 330 of the light guide 30 is an anamorphic surface. The second surface 330 as an anamorphic surface has power for returning the aspect ratio of the image formed by the image display element 10, which has been changed by the anamorphic power of the first surface 310, to the original aspect ratio. Thus, the wearer can visually recognize a virtual image having an appropriate aspect ratio.

The second surface 330, which is a reflective surface, has positive power, for example. The second surface 330 of the reflector 40 converts the image light reflected off the partial reflector 320 and incident upon the reflecting surface into collimated light or substantially collimated light and reflects the collimated light (or substantially collimated light) toward the partial reflector 320. As a result, the collimated light or substantially collimated light proceeds through the light guide 30 in the +y-direction and reflects off the partial reflector 320 in the +z-direction, exiting from the third surface 340 of the light guide 30 to the eyes EY of the wearer. Thus, the light output from the light guide 30 reaches the eyes EY of the wearer.

For the collimated light reflected off the reflecting surface of the reflector 40, the wearer can visually identify an infinite virtual image formed with the collimated light successfully. For the substantially collimated light reflected off the reflecting surface of the reflector 40, the wearer can visually identify a virtual image with an appropriate virtual-image distance between the eyes EY and a plane onto which the virtual image is formed, successfully. The virtual-image distance may be changed as appropriate for the use of the virtual image display device 1A.

In the virtual image display device 1A according to the present embodiment, an intermediate image I of image light from the image display element 10 is formed in the light guide 30. This reduces the thickness of the light guide 30 (in other words, reduce the size of the light guide 30 in the z-direction).

The light guide 30 made of such resin is lightweight. With a decrease in the weight of the light guide 30, the load on the nose of the wearer (the user) decreases. For this reason, the wearer can continue wearing the head-mounted display 1 for a long time without getting fatigued.

Figure 3A:
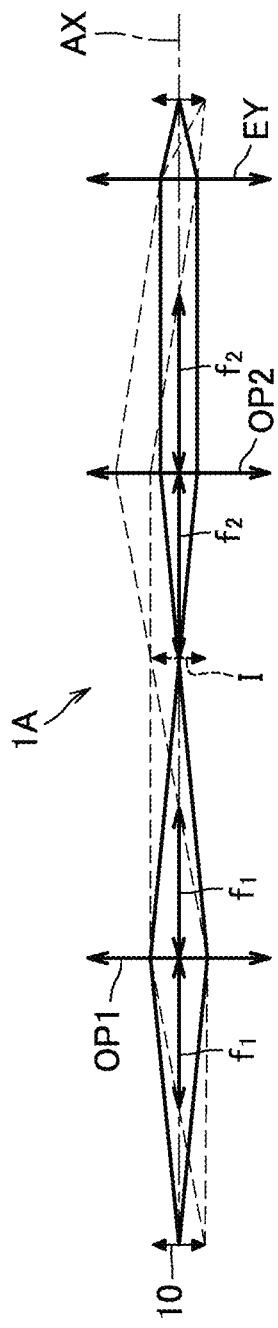
FIG. 3A, FIG. 3B, and FIG. 3C are ray diagrams for describing the reason why the thickness of a light guide can be reduced by forming, within the light guide, an intermediate image with image light from an image display element, according to an embodiment of the present disclosure.
Figure 3B:
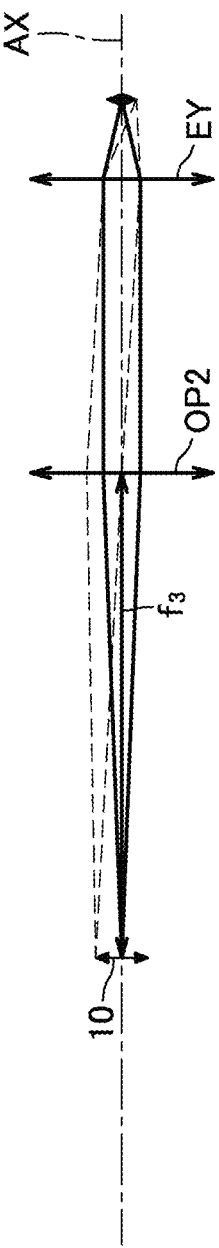
Figure 3C:
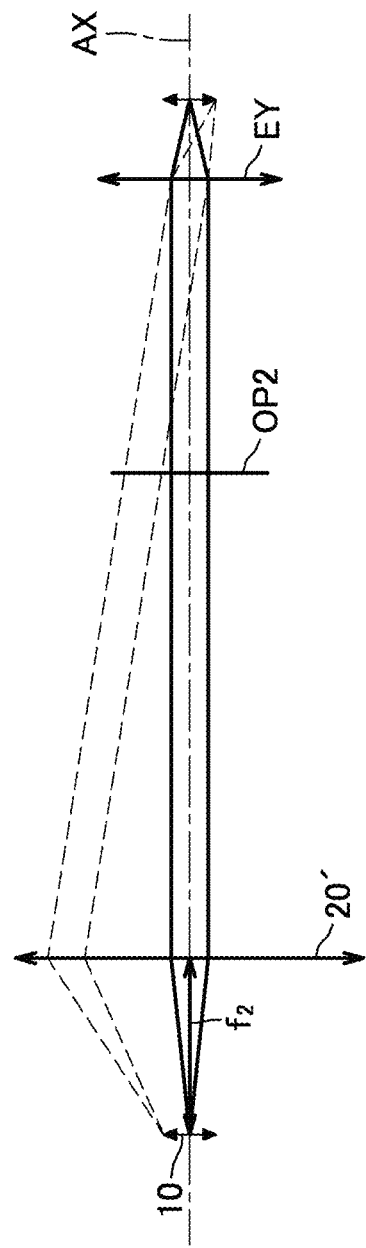

The following describes the reason why the light guide 30 can be made thinner by forming the intermediate image I with the image light emitted from the image display element 10 within the light guide 30 with reference to FIGS. 3A, 3B and 3C.

FIG. 3A is a ray diagram of the virtual image display device 1A according to an embodiment of the present disclosure, in which the intermediate image I has a magnification of 1×. In FIG. 3A, $f_1$ represents the focal length of the first optical portion OP1 (i.e., a portion that forms an intermediate image I), and $f_2$ represents the focal length of the second optical portion OP2.

FIG. 3B is a ray diagram of a virtual image display device in which the use of the first optical portion OP1 is omitted from the virtual image display device 1A according to an embodiment of the present disclosure. In FIG. 3B, $f_3$ indicates the focal length of the second optical portion OP2.

FIG. 3C is a ray diagram of a virtual image display device including a propagation optical system 20' instead of the first optical portion OP1 in the virtual image display device 1A according to an embodiment of the present disclosure. The propagation optical system 20' converts the image light from the image display element 10 into collimated light and emits the collimated light toward the light guide 30. In FIG. 3C, the second optical portion OP2 is a reflection surface (or plane) having no refractive power, which receives collimated light. The angle of view in FIG. 3C is the same as that of FIG. 3A.

In FIGS. 3A to 3C, an axial light beam is indicated by a solid line, and an off-axis light beam is indicated by a broken line. The size of the display image displayed by the image display element 10 is indicated by arrows at the position of the image display element 10. The size is the same between FIGS. 3A, 3B, and 3C.

In order to allow the wearer to see the scenery and the video of the external world, the distance between the image display element 10 or the first optical portion OP1 and the second optical portion OP2 (more specifically, a reflection surface) is provided sufficiently to achieve the intended performance. In FIG. A, the distance between the first optical portion OP1 and the second optical portion OP2 corresponds to the length of the lens portion 3 in the vertical direction (the y-direction) in FIG. 1. This is because the width of the lens portion 3 in the vertical direction is to be set wide so that the wearer can see the scenery of the outside world.

Similarly, in FIG. 3B, the distance between the image display element 10 and the second optical portion OP2, which corresponds to the width of the lens portion 3 in the vertical direction, is to set wide. Similarly, in FIG. 3C, the distance between the propagation optical system 20' and the second optical portion OP2, which corresponds to the width of the lens portion 3 in the vertical direction, is to be set wide.

In FIG. 3B in which the virtual-image distance between the eyes EY and a plane onto which the virtual image is formed is set to infinity, the focal distance 6 is increased to cause the axial light beam and the off-axial light beam to proceed in the thin light guide 30. More specifically, the focal length $f_3$ in FIG. 3B is set so as to correspond to the distance between the image display element 10 and the second optical portion OP2 described above. The image light is collimated by the second optical portion OP2 to allow the wearer to visually identify the virtual image.

As described above, the focal distance 6 is limited by the width of the lens portion 3. For this reason, it is impossible to shorten the focal distance 6. The configuration in FIG. 3B fails to obtain a wider angle of view. In the configuration of FIG. 3B, in order to obtain the angle of view equivalent to that of FIG. 3A, the size of the image display element 10 is to be increased. This, however, increases the size of the virtual image display device itself.

In FIG. 3C in which the virtual-image distance between the eyes EY and a plane onto which the virtual image is formed is set to infinity, the thickness of the light guide 30 is increased in order to obtain the same angle of view as in FIG. 3A (i.e., so that the light guide 30 can also guide an off-axis light beam used for forming a wide angle of view).

More specifically, the propagation optical system 20' in FIG. 3C is to be increased in a direction perpendicular to the optical axis AX (the up-to-down direction in the drawing) so as to allow the off-axial rays (indicated by the broken line in FIG. 3C) from the image display element 10 to proceed through the propagation optical system 20'. To further allow the image light emitted from the propagation optical system 20' to proceed in the light guide 30, the thickness of the light guide 30 is increased up-to-down direction in FIG. 3C.

By contrast, in the virtual image display device 1A as illustrated in FIG. 3A, the intermediate image I is formed at a position closer to the second optical portion OP2 (more specifically, the reflection surface) in the light guide 30 so that the focal length $f_2$ of the second optical portion OP2 can be shortened. This enables a wider angle of view and a thinner light guide 30.

In other words, the light guide 30 with its thickness reduced can also guide or allows an off-axis light beam to proceed therein for a wider angle of view.

In particular, as described above, the size of the intermediate image I is minimized in the thickness direction (i.e., the z-direction) of the light guide 30. This configuration allows a much thinner light guide 30 than a case in which the intermediate image I is formed having the same magnification power in each direction.

Preferably, the magnification in the thickness direction (i.e., the z-direction) of the light guide 30 is reduced to produce a small intermediate image I, so as to achieve a thinner light guide 30 (i.e., a lower thickness of the light guide 30 in the z-direction).

However, the thickness of the light guide 30 in the width direction (i.e., the x-direction) of the light guide 30 is much greater than the thickness in the thickness direction (i.e., the z-direction). In such a configuration, the magnification of the intermediate image I may not be reduced in the width direction (i.e., the x-direction) of the light guide 30. Rather, it is desirable to set the magnification of the intermediate image I in the width direction of the light guide 30 to a magnification suitable for obtaining a wide eye box.

To be more specific, the magnification of the intermediate image I in the second direction (i.e., the x-direction) is set so that the image-forming position of light passed through the aperture stop included in the first optical portion OP1 is located near the eyes EY of the wearer (for example, a corneal position intersecting the optical axis of the eyes EY). Notably, the image-forming position of light passed through the aperture stop corresponds to a position at which light passed through the aperture stop forms an image, which is caused by the optical system subsequent to the aperture stop (i.e., the position corresponding to the exit pupil position of the optical system subsequent to the aperture stop).

Figure 4A:
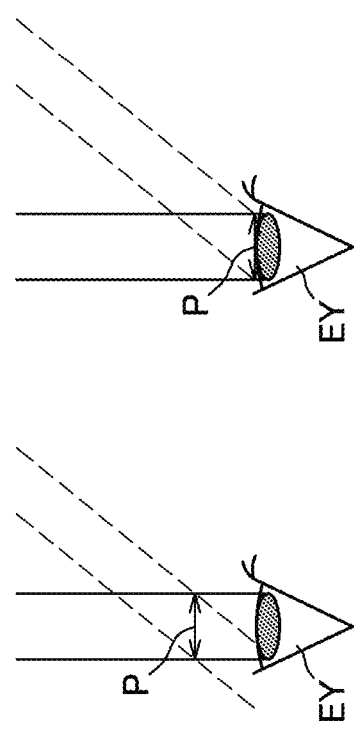
FIG. 4A is a diagram for describing why an image-forming position of light passed through an aperture stop in the vicinity of the eyes of a wearer allows a wider eye box.
Figure 4B:
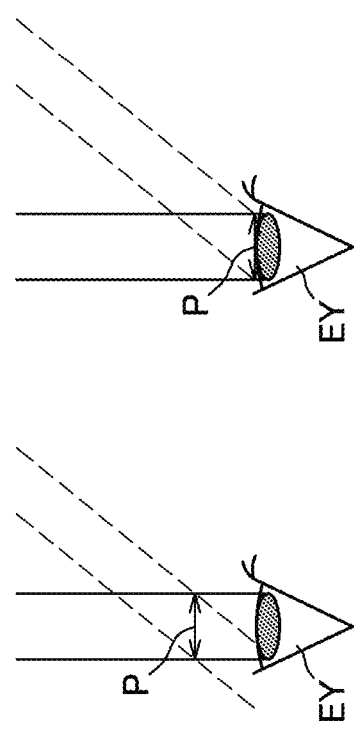
FIG. 4B is another diagram for describing why the image-forming position of light passed through the aperture stop in the vicinity of the eyes of the wearer allows a wider eye box.

FIGS. 4A and 4B are illustrations for describing why the image-forming position P of light passed through the aperture stop being near the eyes EY of the wearer allows a wider eye box. For convenience of brief description, the eye box is defined by a range in which on-axis light indicated by solid lines in FIGS. 4A and 4B and off-axis light indicated by dotted lines in FIGS. 4A and 4B enter the eyes EY.

As illustrated in FIG. 4A, with the image-forming position P of light passed through the aperture stop being away from the eyes EY of the wearer, most of the off-axis light fails to enter the eyes EY. This hampers the off-axis light from entering the eyes when the wearer slightly moves the line of sight.

In other words, the eye box in FIG. 4A is small (or narrow). Although expanding the beam diameter provides a wider eye box, correction of various aberrations will be difficult due to the expansion of the beam diameter.

As illustrated in FIG. 4B, with the image-forming position P of light passed through the aperture stop is near the eyes EY of the wearer, both the off-axis light and the on-axis light enter the eyes EY in a large amount. This allows the off-axis light to enter the eyes irrespective of the wearer's slight movement of the line of sight. In other words, the image-forming position P being near the eyes EY as illustrated in FIG. 4B allows a wider eye box.

Figure 5:
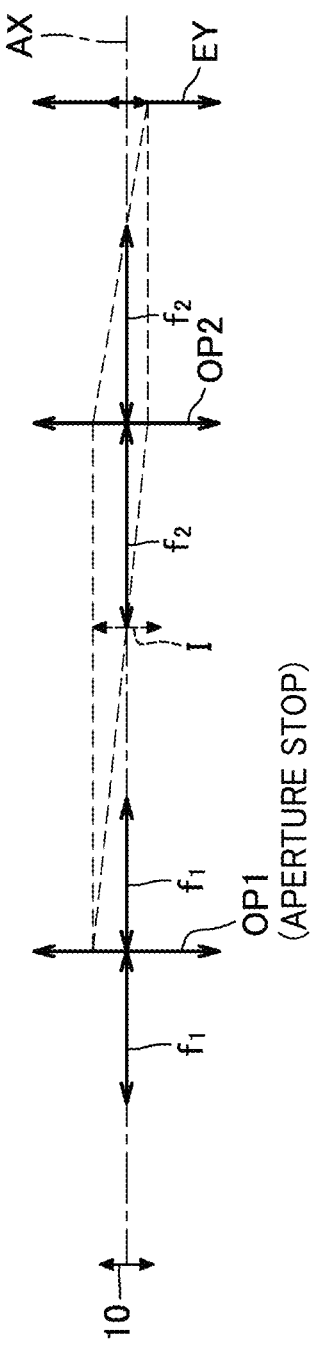
FIG. 5 is an illustration of the relation between the aperture stop and image formation.

FIG. 5 is an illustration of the relation between the aperture stop and image formation. In the example of FIG. 5, it is assumed that the aperture stop is disposed immediately after the first optical portion OP1. As illustrated in FIG. 5, the image-forming position of light passed through the aperture stop is determined depending on the focal length $f_2$ of the second optical portion OP2.

For example, as the focal distance $f_2$ is longer, the image-forming position of light passed through the aperture stop is farther from the second optical portion OP2. As the focal length $f_2$ is shorter, the image-forming position of light passed through the aperture stop is closer to the second optical portion OP2.

In the present embodiment, the focal length $f_2$ of the second optical portion OP2 is set shorter in the yz cross-sectional plane (FIG. 2A) including the thickness direction (i.e., the z-direction) of the light guide 30 to reduce the size (i.e., the size in the z-direction) of the intermediate image I while obtaining a wider angle of view. For this reason, the image-forming position P of light passed through the aperture stop is disposed close to the second optical portion OP2 that is away from the eyes EY of the wearer. This results in a narrower eye box.

In the present embodiment, the light guide 30 includes multiple partial reflectors 320. The image light is split into multiple light beams by the multiple partial reflectors 320, and thus a wide eye box is provided in the y-direction.

However, if the focal length f of the second optical portion OP2 is excessively reduced in the xy cross-sectional plane (FIG. 2B) including the width direction (i.e., the x-direction) of the light guide 30, image-forming position P of light passed through the aperture stop will be too close to the second optical portion OP2 (for example, FIG. 4A). This hampers obtaining a wide eye box.

To avoid a narrow eye box, the focal length f2 of the second optical portion OP2 in the xy cross-sectional plane is set longer than the focal length f2 of the second optical portion OP2 in the yz cross-sectional plane.

To differentiate the focal length between the xy cross-sectional plane and the yz cross-sectional plane, in the virtual image display device 1A of the present embodiment, the first optical portion OP1 is given an anamorphic power to differentiate the first magnification in the first direction (e.g., the z-direction) from the second magnification in the second direction (e.g., the x-direction) for the intermediate image I.

In one example, the first magnification in the first direction (e.g., the z-direction) is, for example, the minimum magnification among the magnifications in all directions to reduce the thickness of the light-guide member in the z-direction (i.e., the thickness direction). The second magnification in the second direction (i.e., the z-direction) for the intermediate image I is, for example, the maximum magnification among the magnifications in all directions to achieve a focal length 6 suitable to locate image-forming position P of light passed through the aperture stop near the eyes EY.

In short, the virtual image display device 1A according to the present embodiment includes a first optical portion OP1; a light guide 30; and a second optical portion OP2.

Image light from the image display element 10 that displays an image formed by the image light enters the first optical portion OP1. The first optical portion OP1 has an anamorphic surface having the first magnification in the first direction and the second magnification in the second direction different from the first direction. The light guide 30 guides the image light entered into the first optical portion OP1. The second optical portion OP2 directs the image light guided by the light guide 30 to the eyes EY of the wearer. The first optical portion OP1 forms an intermediate image I with the image light in the light guide 30, the intermediate image I having the first magnification in the first direction and the second magnification in the second direction, the first magnification being different from the second magnification.

The following describes a specific configuration of the virtual image display device 1A according to the present embodiment.

In order to obtain an appropriate distance to a virtual image, the virtual image display device 1A satisfies the following formula (1), where TLmax is the distance (unit: mm) between the image-forming position, at which the first optical portion OP1 forms an intermediate image I, and the reflection surface included in the second optical portion OP2 (e.g., the second surface 330 of the light guide 30 in FIG. 2B) in a cross-sectional plane (e.g., the xy cross-sectional plane in the present embodiment) in which an absolute value of the magnification of the intermediate image I is maximized; and Rmax is the paraxial radius of curvature (unit: mm) of the reflection surface in the cross-sectional plane in which the absolute value of the magnification of the intermediate image I is maximized.

$$-0.9 < TLmax/Rmax < -0.3 \quad \text{Formula (1)}$$

If the value of TLmax/Rmax is −0.9 or less, the power of the reflection surface becomes too strong in the xy cross-sectional plane in which an absolute value of the magnification of the intermediate image I is maximized, and the distance to the virtual image becomes far from infinity. If the value of TLmax/Rmax is −0.3 or greater, the power of the reflection surface becomes too weak, and the distance to the virtual image becomes too short.

In order to obtain an appropriate distance to a virtual image, the virtual image display device 1A satisfies the following formula (2), where TLmin is the distance (unit: mm) between the image-forming position at which an intermediate image I is formed and the reflection surface included in the second optical portion OP2 (e.g., the second surface 330 of the light guide 30 in FIG. 2B) in a cross-sectional plane (e.g., the yz cross-sectional plane in the present embodiment) in which an absolute value of the magnification of the intermediate image I is minimized; and Rmin is the paraxial radius of curvature (unit: mm) of the reflection surface in the cross-sectional plane in which the absolute value of the magnification of the intermediate image I is minimized.

$$-0.7 < TLmin/Rmin < -0.1 \quad \text{Formula (2)}$$

If the value of TLmin/Rmin is −0.7 or less, the power of the reflection surface becomes too strong in the yz cross-sectional plane in which an absolute value of the magnification of the intermediate image I is minimized. If the value of TLmin/Rmin is −0.1 or greater, the power of the reflection surface becomes too weak, and the distance to the virtual image becomes too short.

In order to achieve further downsizing and higher performance, the virtual image display device 1A may be configured to satisfy the following formula (3):

$$0.3 < TLmin/TLmax < 0.9 \quad \text{Formula (3)}$$

If the value of TLmin/Rmin is −0.3 or less, a ratio between the absolute values of the magnification of the intermediate image I becomes too small, sufficient correction of various aberrations becomes difficult. If the value of TLmin/Rmin is 0.9 or greater, the absolute value of a magnification in the thickness direction, or the z-direction) of the light guide 30 approximates the absolute value of a magnification in the width direction, or the x-direction) of the light guide 30. Thus, reducing the thickness of the light guide 30 in the second direction becomes difficult (i.e., a thinner light guide 30 is difficult to obtain).

In order to achieve further downsizing and higher performance, the virtual image display device 1A may be configured to satisfy the following formula (4) where βmin is a minimum absolute value of the magnification of the intermediate image I, and βmax is a maximum absolute value of the magnification of the intermediate image I:

$$0.4 < \beta min/\beta max < 0.95 \quad \text{Formula (4)}$$

If the value of βmin/βmax is 0.4 or less, a ratio between the absolute values of the magnification of the intermediate image I becomes too small, and sufficient correction of various aberrations becomes difficult. If the value of βmin/βmax is 0.95 or greater, the absolute value of the magnification in the thickness direction, or the z-direction of the light guide 30 approximates the absolute value of the magnification in the width direction, or the x-direction, of the light guide 30. Thus, reducing the thickness of the light guide 30 becomes difficult (i.e., a thinner light guide 30 is difficult to obtain).

In order to achieve further downsizing and higher performance, the virtual image display device 1A may be configured to satisfy the following formula (5):

$$0.5 < \beta min < 2.0 \quad \text{Formula (5)}$$

If the value of βmin is 0.5 or less, the focal distance $f_2$ of the second optical portion OP2 becomes too short, and the pupil position of the optical system (for example, the image-forming position of light passed through the aperture stop) is closer to the second optical portion OP2.

In the configuration FIG. 2A and FIG. 2B, a larger partial reflector 320 is used, which causes upsizing of the virtual image display device 1A. If the value of βmin is 2.0 or greater, reducing the size of the virtual image display device 1A becomes difficult in a cross-sectional plane (e.g., the yz cross-sectional plane in the present embodiment) in which the absolute value of the magnification of the intermediate image I is minimized.

Specific Numerical Example 1 to Numerical Example 4 of the virtual image display device 1A will be described. In Numerical Example 1 to Numerical Example 4 below, following the usual practice of representing the shape of optical components, a description is given with another coordinate axis. Specifically, two directions orthogonal to the optical axis AX are the x1-direction and the y1-direction. In the virtual image display device 1A mounted on a head-mounted display 1, the x-direction is coincident with the width direction of the lens portions 3. The y1-direction is a thickness direction of the lens portion 3, the thickness direction being orthogonal to the optical axis AX and the width direction of the lens portion 3. When the optical path is bent by 90 degrees by the partial reflector 320, the direction of the optical axis AX is also changed by 90 degrees, so that the x1-direction and the y1-direction are also rotated by 90 degrees.

In Numerical Example 1 to Numerical Example 4, the effective pixel area of the image display element 10 has a rectangular shape of 3.3 mm in the vertical direction, 5.8 mm in the horizontal direction, and 6.67 mm in the diagonal direction.

In Numerical Example 1 to Numerical Example 4, the distance to the virtual image is infinity. The aberration diagrams in Numerical Example 1 to Numerical Example 4 are calculated when an image is formed with an ideal lens having a focal distance of 17 mm.

Numerical Example 1

FIGS. 6A and 6B are diagrams of the optical configuration of the virtual image I) display device 1A according to Numerical Example 1. FIG. 6A indicates a yz cross-sectional plane of the virtual image display device 1A. FIG. 6B indicates an xy cross-sectional plane of the virtual image display device 1A. Note that the yz cross-sectional plane in FIG. 6A and the xy cross-sectional plane in FIG. 6B are cross sections when the optical axis AX is set as the y-direction, and a direction in which image light is directed to the eye EY of the wearer is set as the z-direction.

The virtual image display device 1A according to Numerical Example 1 includes the image display element 10 and an optical system for the virtual image display device in order from the image display element 10. In the optical system for the virtual image display device, the first optical portion OP1 located in front of the intermediate image I includes a lens group L1 including multiple lenses, an aperture stop, and a first surface 310 of the light guide 30. The second optical portion OP2 located behind the intermediate image I includes a second surface 330 of the light guide 30 and a single lens L2. In Numerical Example 1, seven partial reflectors 320 formed in a planar shape are included in the light guide 30.

In Numerical Example 1, the angles of view in the vertical direction, the horizontal direction, and the diagonal direction are 20.3 degrees, 35.6 degrees, and 40.2 degrees, respectively. The aperture stop a has a rectangular aperture of 1.0 mm in the y-direction and 6.5 mm in the x-direction.

Table 1 presents a specific numerical configuration of the virtual image display device 1A according to Numerical Example 1. In Table 1, Ry is a radius of curvature (or a paraxial radius of curvature) (mm) of each surface of the optical elements along a y1-axis that is an axis in the y1-direction, i.e., a radius of curvature (or a paraxial radius of curvature) of a cross-sectional plane of a lens in a yz plane orthogonal to the AX-axis, and Rx is a radius of curvature (or a paraxial radius of curvature)(mm) of each surface of the optical elements along an x1-axis that is an axis in the x1-direction, i.e., a radius of curvature (or a paraxial radius of curvature) of a cross-sectional plane of a lens in an xz plane orthogonal to the axis AX. Further, D is the thickness of each optical element on the optical axis AX or the distance between the optical elements on the optical axis AX, Nd is a refractive index for the d-line (a wavelength of 587.562 nm), and νd is an Abbe number of the d-line. The right column of the Abbe number in the Table 1 presents the product name and manufacturer of the material of the optical element.

The numbers in the Table are assigned to the respective surfaces of the virtual image display device 1A in order from the image display element 10. Herein, number 0 in the Table indicates an image display surface (i.e., pixel array surface) of the image display element 10. Numbers 1 and 2 in the Table indicate the respective surfaces of the cover glass included in the image display element 10. The cover glass is a glass plate that covers the image display surface of the image display element 10.

Numbers 3 to 14 in the Table indicate the optical surfaces forming the first optical portion OP1. Number 9 in the Table indicates the aperture stop a.

Numbers 15 to 19 in the Table indicate the optical surfaces forming the second optical portion OP2. More specifically, numbers 15, 16, and 17 in the Table indicate the second surface 330 of the light guide 30, the first surface, and the second surface of the single lens L2, respectively. Numbers 18 and 19 in the Table indicate the first surface of the single lens L2 and the second surface 330 of the light guide 30, respectively.

In Numerical Example 1, the first surface of each of the single lenses L2 is a reflection surface that reflects the image light transmitted through the partial reflector 320 back to the partial reflector 320.

The mark "A" in the column of the interval D for No. 19 in Table 1 indicates the distance between the second surface 330 and each partial reflector 320 (partial reflection surface) along the optical axis AX. For convenience, this distance will be referred to as distance A. Starting from the partial reflector that is closest to the second surface 330, the distances A to the seven partial reflectors 320 are 15 mm, 16 mm, 17 mm, 18 mm, 19 mm, 20 mm, and 21 mm. In other words, the seven partial reflectors 320 are disposed at equal intervals of 1 mm. In FIG. 4, only the smallest distance A (i.e., 15 mm) and the largest distance A (i.e., 21 mm) are indicated.

Number 20 in Table 7 indicates the partial reflector 320. Number 21 in Table 7 indicates the third surface 340 of the light guide 30. The interval D for the number 21 indicates a distance between the third surface 340 and the eye EY of the wearer, that is, an eye relief.

TABLE 1

| Numerical Example 1 | | | | | | |
|---|---|---|---|---|---|---|
| | Ry | Rx | D | Nd | νd | |
| 0 | ∞ | ∞ | 0.00 | | | |
| 1 | ∞ | ∞ | 0.30 | 1.51633 | 64.14 | S-BSL7(OHARA) |
| 2 | ∞ | ∞ | 0.57 | | | |

TABLE 1-continued

Numerical Example 1

| | Ry | Rx | D | Nd | νd | | |
|---|---|---|---|---|---|---|---|
| 3* | 5.689 | −28.412 | 1.41 | 1.83200 | 23 | | OKP4HT(Osaka Gas Chemicals) |
| 4* | 2.799 | −23.894 | 1.41 | | | | |
| 5* | 18.620 | 34.564 | 3.41 | 1.53100 | 56 | | E48R(ZEON) |
| 6* | −21.411 | −7.546 | 5.36 | | | | |
| 7* | 6.228 | 5.854 | 3.00 | 1.53100 | 56 | | E48R(ZEON) |
| 8* | −65.103 | −15.859 | 0.00 | | | | |
| 9 | STOP | | 0.76 | | | | |
| 10* | −3.086 | 112.703 | 0.90 | 1.63200 | 23 | | OKP4HT(Osaka Gas Chemicals) |
| 11* | −11.052 | 6.755 | 0.43 | | | | |
| 12* | 10.663 | 5.888 | 2.50 | 1.53100 | 56 | | E48R(ZEON) |
| 13* | −4.689 | −23.295 | 0.20 | | | | |
| 14 | ∞ | ∞ | 33.50 | 1.53100 | 56 | | E48R(ZEON) |
| 15* | −4.506 | −33.922 | 3.21 | | | | |
| 16* | −4.631 | −17.048 | 1.87 | 1.53100 | 56 | REFLECTION | E48R(ZEON) |
| 17* | −30.441 | −32.101 | −1.87 | 1.53100 | 56 | | E48R(ZEON) |
| 18* | −4.631 | −17.048 | −3.21 | | | | |
| 19* | −4.506 | −33.922 | A | 1.53100 | 56 | | E48R(ZEON) |
| 20 | ∞ | ∞ | 2.50 | 1.53100 | 56 | REFLECTION | E48R(ZEON) |
| 21 | ∞ | ∞ | 15.000 | | | | |

In Table 1, the surfaces marked with "*" represent aspherical surfaces. More specifically, these aspherical surfaces are anamorphic aspherical surfaces having an anamorphic power. Table 2 is a list of data of each aspherical surface. In Table 2, the capital letter "E" represents a power in which 10) is the base and the number on the right of E is an exponent. The radius of curvature R of the aspherical surface is represented by a radius of curvature (paraxial radius of curvature) along the optical axis AX. The aspherical shape is given by the following equation, where Z is a sag amount, C is a paraxial radius of curvature (1/R), h is a height from the optical axis AX (mm), K is a conic constant, and A4, A6, are aspherical coefficients of even orders equal to or higher than the fourth order.

$$Z = Ch^2/\{1+\sqrt{1-(1+k)c^2h^2}\} + a_4 \cdot h^4 + a_6 \cdot h^6 + a_8 \cdot h^8 + a_{10} \cdot h^{10}$$

Further, the shape of the anamorphic aspherical surface satisfies the following equation where Cx is a paraxial radius of curvature (1/Rx) in the x1-axis, Cy is a paraxial radius of curvature in the y1-axis, X (mm) is the height in the x1-axis from the optical axis AX, Y (mm) is the height in the y1-axis from the optical axis AX; Kx is the conic constant in the x-axis, Ky is the conic constant in the y1-axis, AR4, AR6, are even-numbered coefficients of rotational symmetry equal to or higher than the fourth order, and AP4, AP6, are even-numbered coefficients of rotational asymmetry equal to or higher than the fourth order.

$$Z = (CxX^2 + CyY^2)/\{1+\sqrt{1-(1+Kx)Cx^2X^2-(1+Ky)Cy^2Y^2)}\} + AR_4((1-AP_4)X^2+(1+AP4)Y^2)^2 + AR_6((1-AP_6)X^2+(1+AP_6)Y^2)^3 + AR_8((1-AP_8)X^2+(1+AP_8)Y^2)^4 + AR_{10} \cdot ((1-AP_{10})X^2+(1+AP_{10})Y^2)^5$$

The description format of the Table is the same in the following Numerical Example 2 to Numerical Example 4.

TABLE 2

Numerical Example 1

| Conic coefficient | | |
|---|---|---|
| | Ky | Kx |
| 3 | 0.000 | 0.000 |
| 4 | 0.000 | 0.000 |
| 5 | 0.000 | 0.000 |
| 6 | −127.395 | −11.481 |
| 7 | 1.658 | −0.086 |
| 8 | 0.000 | 0.000 |
| 10 | 0.000 | 0.000 |
| 11 | 0.000 | 0.000 |
| 12 | −5.225 | 0.799 |
| 13 | 0.000 | 0.000 |
| 15, 19 | −0.085 | −3.497 |
| 16, 17 | −0.358 | −0.266 |
| 18 | 0.000 | 0.000 |

| Rotational symmetry coefficient | | | | |
|---|---|---|---|---|
| | $AR_4$ | $AR_6$ | $AR_8$ | $AR_{10}$ |
| 3 | −7.73123E−03 | −3.51289E−05 | 7.62856E−06 | 1.85801E−11 |
| 4 | −1.17866E−02 | 5.68737E−06 | −1.87692E−04 | 1.97018E−05 |
| 5 | −4.41413E−03 | −3.91897E−06 | −2.14961E−04 | −3.48629E−08 |
| 6 | −2.54578E−03 | 1.56024E−04 | −9.83271E−06 | 1.74249E−07 |
| 7 | 4.50406E−04 | −2.99426E−05 | −8.07497E−05 | 2.59875E−08 |

TABLE 2-continued

| | | Numerical Example 1 | | |
|---|---|---|---|---|
| 8 | −9.57945E−05 | 1.34175E−05 | 1.17411E−06 | 3.72008E−05 |
| 10 | −7.77583E−04 | −9.18008E−06 | 6.21665E−07 | 6.69977E−05 |
| 11 | 1.15037E−04 | −7.61688E−05 | −5.65925E−07 | −5.66392E−10 |
| 12 | −1.48320E−03 | −6.16248E−05 | −1.68368E−07 | −2.80790E−10 |
| 13 | 4.52251E−04 | 3.99524E−08 | 1.47564E−13 | −6.89083E−07 |
| 15, 19 | −5.30808E−08 | 5.94093E−06 | 7.47250E−11 | 5.15744E−09 |
| 16, 17 | −2.24024E−06 | 5.51073E−11 | −3.82564E−12 | 6.26385E−07 |
| 18 | −7.60837E−06 | −1.98635E−08 | 1.30622E−10 | −5.94934E−13 |

| | Rotational asymmetry coefficient | | | |
|---|---|---|---|---|
| | $AP_4$ | $AP_6$ | $AP_8$ | $AP_{10}$ |
| 3 | 7.56652E−01 | −1.35523E+00 | −4.16576E−01 | −7.88735E+00 |
| 4 | 8.98361E−01 | 3.10836E+00 | 1.26448E+00 | 1.25338E+00 |
| 5 | 8.88786E−01 | 3.01173E+00 | 1.01602E+00 | −2.22718E−01 |
| 6 | −5.82259E−02 | −6.98181E−02 | 6.25123E−03 | 3.87566E−03 |
| 7 | 5.03527E−01 | 3.66392E−01 | 1.11608E+00 | −1.04231E−02 |
| 8 | −3.17812E−01 | 5.96345E−01 | 2.03828E+00 | 1.24013E+00 |
| 10 | −1.47707E−01 | −6.12941E−01 | 2.34992E+00 | 1.21051E+00 |
| 11 | −1.50323E−02 | 1.41096E+00 | 2.13194E+00 | 4.02155E+00 |
| 12 | 1.10849E−01 | 1.43285E+00 | −1.19221E+00 | 3.88434E+00 |
| 13 | 1.05405E−01 | −4.67819E+00 | 5.53378E+01 | 6.06683E−01 |
| 15, 19 | −1.48891E+01 | 9.68270E−01 | −2.97324E−01 | 1.12989E+00 |
| 16, 17 | −2.36621E+00 | 1.35375E+01 | −1.67175E+00 | 1.03072E+00 |
| 18 | 1.90536E−01 | −1.62582E−02 | −6.21050E−02 | 1.04507E−01 |

Figure 7A:
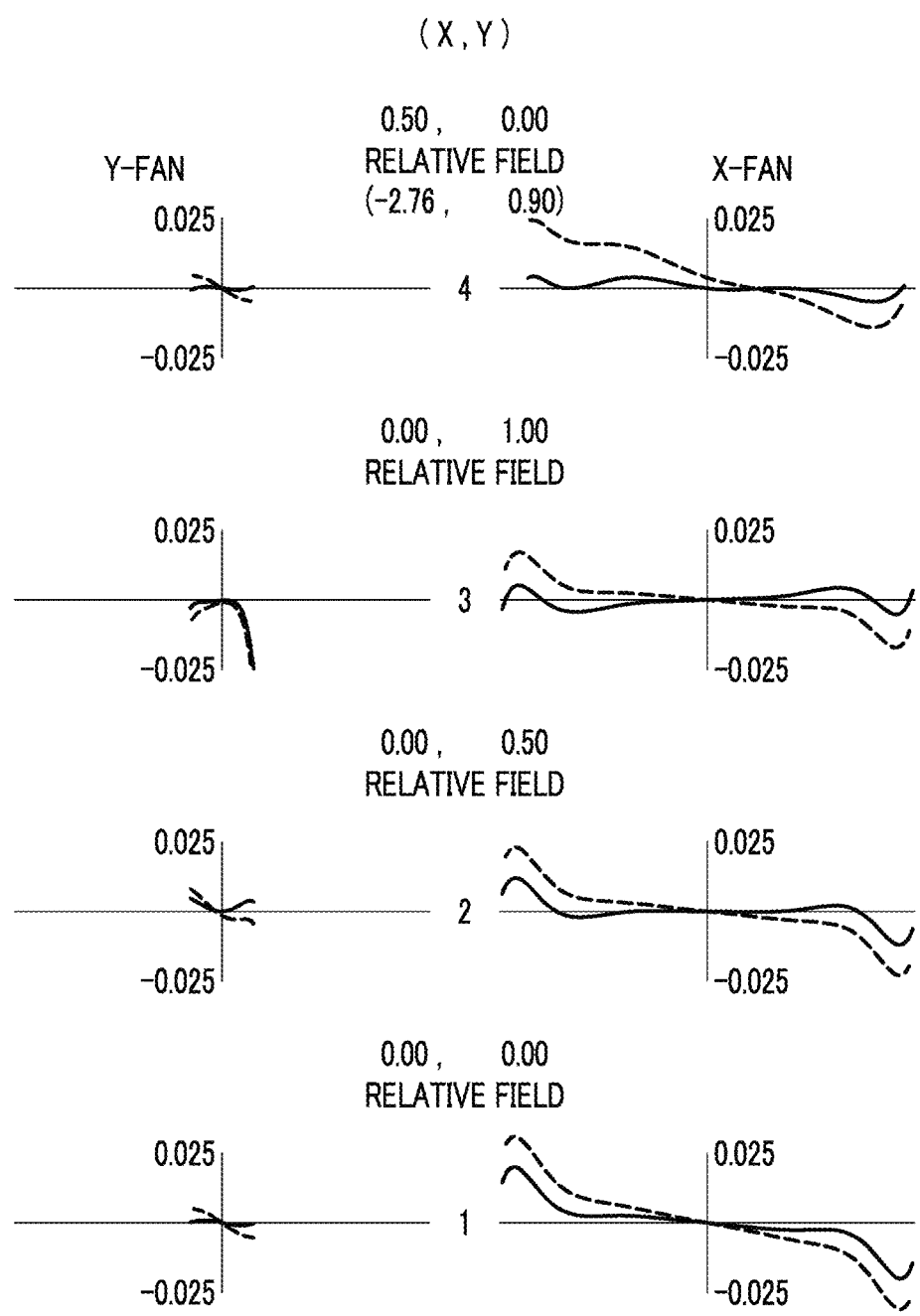
FIG. 7A is a lateral aberration diagram of the virtual image display device according to Numerical Example 1.
Figure 7B:
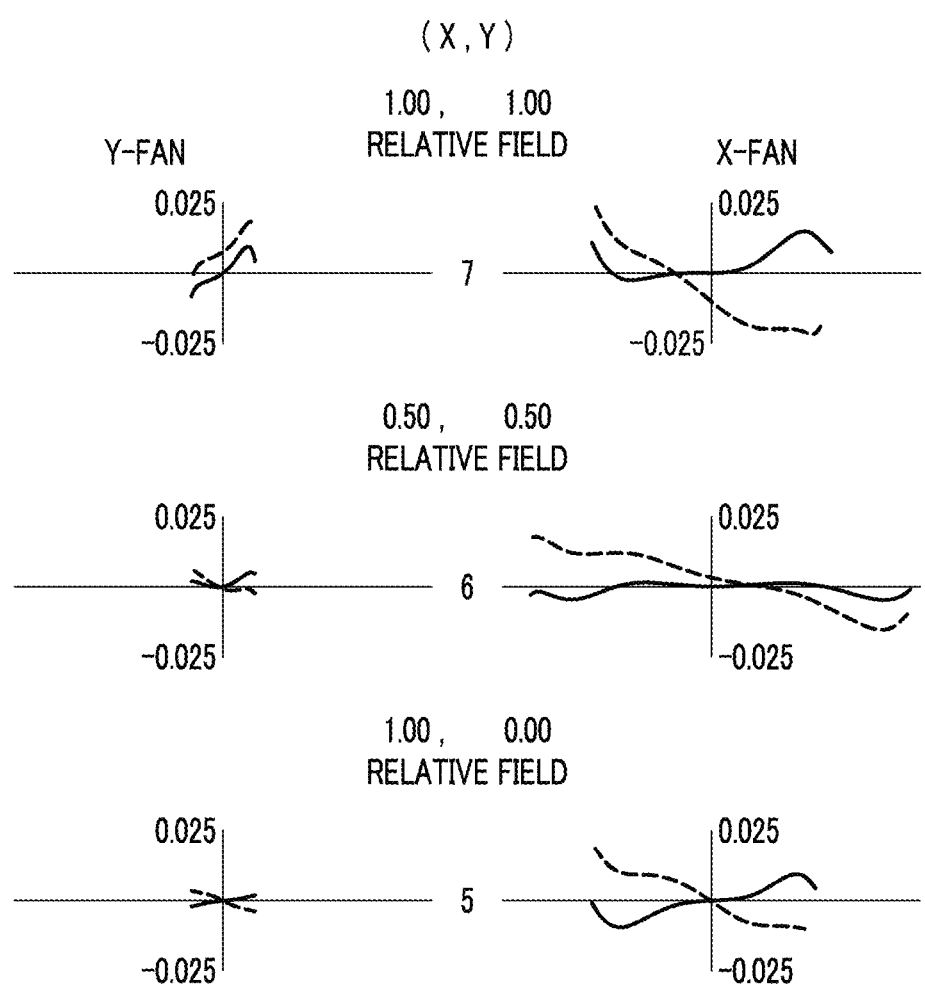
FIG. 7B is another lateral aberration diagram of the virtual image display device according to Numerical Example 1.
Figure 8:
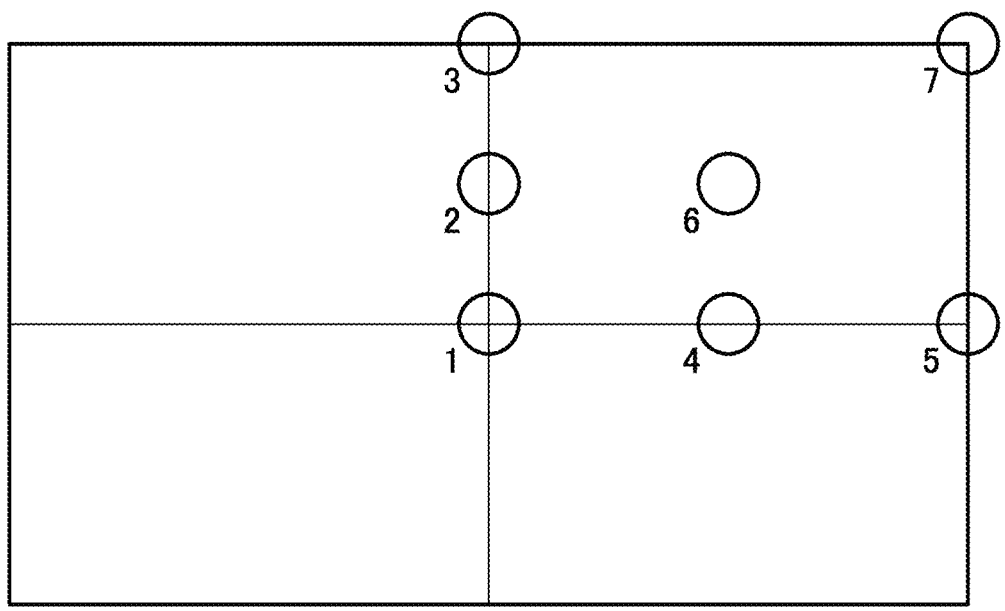
FIG. 8 is an illustration of measurement positions of lateral aberrations according to Numerical Examples.

FIGS. 7A and 7B are lateral aberration diagrams of the virtual image display device 1A according to Numerical Example 1. The lateral aberration diagram indicates lateral aberrations for the d-line and the g-line (wavelengths of 435, 834 nm) at coordinates 1 to 7 in the virtual image. The positions of the coordinates 1 to 7 are as illustrated in FIG. 8.

In each of FIGS. 7A and 7B, the solid line indicates the lateral aberration for the d-line, and the broken line indicates the lateral aberration for the g-line. The lateral aberration is measured in each of the x1-direction and the y1-directions. The left diagram ("Y-FAN" noted at the top) of each of FIGS. 7A and 7B indicates lateral aberration in the y1-direction, and the right diagram ("X-FAN" noted at the top) of each of FIGS. 7A and 7B indicates lateral aberration in the x-direction.

In Numerical Example 1, the first optical portion OP1 having an anamorphic power forms the first magnification in the first direction and the second magnification in the second direction in the light guide 30. Thus, the light guide 30 can be made thinner. Numerical Example 1 satisfies all of the above formulae (1) to (5) as described below.

Value of TLmax/Rmax: −0.70 (see formula (1))
Value of TLmin/Rmin: −0.32 (see formula (2))
Value of TLmin/TLmax: 0.44 (see formula (3))
Value of βmin/βmax: 0.77 (see formula (4)) Value of βmin: 1.28 (see formula (5))

In the virtual image display device 1A according to Numerical Example 1, various aberrations are successfully corrected (see FIGS. 7A and 7B), a wide angle of view (for example, an angle of view exceeding 40 degrees in a diagonal direction) is obtained, and desired image quality is achieved. In addition, in the virtual image display device 1A according to Numerical Example 1, various effects are obtained by satisfying the above-described formulae (1) to (5).

Numerical Example 2

Figure 9B:
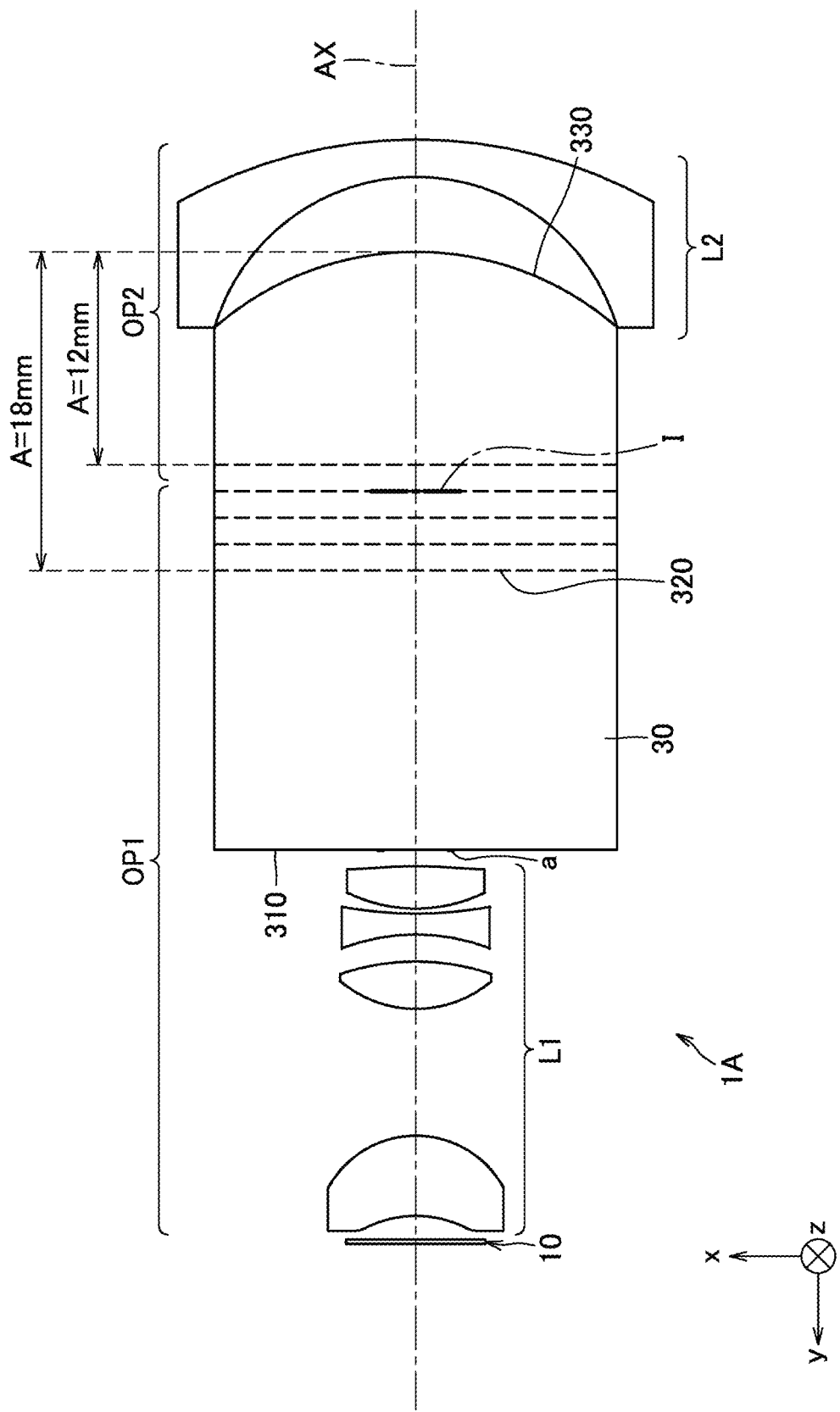
FIG. 9B is another diagram of the optical configuration of the virtual image display device according to Numerical Example 2.

FIGS. 9A and 9B are diagrams of the optical configuration of a virtual image display device 1A according to Numerical Example 2. In Numerical Example 2, five partial reflectors 320 formed in a planar shape are included in the light guide 30.

In Numerical Example 2, the angles of view in the vertical direction, the horizontal direction, and the diagonal direction are 20.3 degrees, 35.1 degrees, and 40.8 degrees, respectively. The aperture stop a has a rectangular aperture of 1.8 mm in the y1-direction and 5.8 mm in the x1-direction.

Table 3 presents a specific numerical configuration of the virtual image display device 1A according to Numerical Example 2. In Numerical Example 2, the values of distance A to the five partial reflectors are 12 mm, 13.5 mm, 15 mm, 16.5 mm, and 18 mm in order from the partial reflector 320 closest to the second surface 330 among the five partial reflectors 320. In other words, the five partial reflectors 320 are disposed at equal intervals of 1.5 mm. Table 4 lists data for each aspherical surface according to Numerical Example 2.

In Numerical Example 2 as well, the first surface of each of the single lenses L2 is a reflection surface that reflects the image light transmitted through the partial reflector 320 back to the partial reflector 320.

TABLE 3

| | | Numerical Example 2 | | | | |
|---|---|---|---|---|---|---|
| | Ry | Rx | D | ND | νd | |
| 0 | ∞ | ∞ | 0.00 | | | |
| 1 | ∞ | ∞ | 0.30 | 1.51633 | 64.14 | S-BSL7(OHARA) |
| 2 | ∞ | ∞ | 1.27 | | | |

TABLE 3-continued

Numerical Example 2

| | Ry | Rx | D | ND | νd | | |
|---|---|---|---|---|---|---|---|
| 3* | −6.440 | −8.204 | 4.57 | 1.53100 | 56 | | E48R(ZEON) |
| 4* | −5.799 | −6.496 | 7.12 | | | | |
| 5* | 20.888 | 7.000 | 2.68 | 1.63500 | 24 | | EP5000(MITSUBISHI GAS CHEMICAL TRADING) |
| 6* | 15.964 | −19.623 | 1.82 | | | | |
| 7* | −3.653 | −10.088 | 1.13 | 1.53100 | 56 | | E48R(ZEON) |
| 8* | −10.093 | 30.516 | 0.20 | | | | |
| 9* | 5.276 | 7.063 | 2.47 | 1.53100 | 56 | | E48R(ZEON) |
| 10* | −8.223 | −11.907 | 0.89 | | | | |
| 11 | STOP | | 0.00 | | | | |
| 12 | ∞ | ∞ | 33.80 | 1.53100 | 56 | | E48R(ZEON) |
| 13* | −6.480 | −19.737 | 4.21 | | | | |
| 14* | −7.413 | −12.318 | 2.14 | 1.53100 | 56 | REFLECTION | E48R(ZEON) |
| 15* | −30.705 | −28.954 | −2.14 | 1.53100 | 56 | | E48R(ZEON) |
| 16* | −7.413 | −12.318 | −4.21 | | | | |
| 17* | −8.480 | −19.737 | A | 1.53100 | 56 | | E48R(ZEON) |
| 18 | ∞ | ∞ | 2.50 | 1.53100 | 56 | REFLECTION | E48R(ZEON) |
| 19 | ∞ | ∞ | 15.000 | | | | |

TABLE 4

Numerical Example 2

Conic coefficient

| | Ky | Kx |
|---|---|---|
| 3 | 0.000 | 0.000 |
| 4 | −5.072 | 0.346 |
| 5 | 41.751 | −0.433 |
| 6 | 0.000 | 0.000 |
| 7 | 0.000 | 0.000 |
| 8 | 0.000 | 0.000 |
| 9 | 0.737 | −1.278 |
| 10 | −5.628 | −10.618 |
| 13, 17 | 0.000 | −0.016 |
| 14, 16 | −0.084 | 0.012 |
| 15 | 0.000 | 0.000 |

Rotational symmetry coefficient

| | $AR_4$ | $AR_6$ | $AR_8$ | $AR_{10}$ |
|---|---|---|---|---|
| 3 | 3.89451E−04 | −4.07082E−05 | 3.56171E−07 | 9.61866E−08 |
| 4 | −1.01330E−03 | 2.86266E−05 | 2.69638E−08 | −3.86609E−08 |
| 5 | −2.45711E−04 | 1.24708E−05 | −1.30616E−08 | 1.55257E−09 |
| 6 | −1.56808E−03 | 9.20497E−05 | −2.36966E−06 | 1.84855E−08 |
| 7 | −2.29789E−04 | 2.325486E−05 | −2.94416E−06 | 6.56313E−08 |
| 8 | 2.56354E−04 | −3.78023E−05 | 8.77517E−08 | 5.86124E−08 |
| 9 | −1.26672E−03 | 4.87976E−05 | 2.29942E−06 | −3.33838E−08 |
| 10 | −1.34896E−04 | 8.14989E−05 | 1.34163E−06 | 4.29449E−08 |
| 13, 17 | 5.87091E−05 | 3.19530E−06 | −5.21319E−09 | −2.06126E−10 |
| 14, 16 | −1.18429E−07 | 3.14962E−06 | −3.89923E−10 | −1.50354E−11 |
| 15 | −2.38559E−05 | −9.32918E−08 | 1.06728E−09 | −3.76903E−12 |

Rotational asymmetry coefficient

| | $AP_4$ | $AP_6$ | $AP_8$ | $AP_{10}$ |
|---|---|---|---|---|
| 3 | −7.57990E−01 | −1.23169E+00 | −1.17183E−02 | −8.59983E−01 |
| 4 | 6.33894E−01 | 1.16918E+00 | 4.61763E−01 | −6.52877E−02 |
| 5 | −2.62967E−01 | −5.47467E−02 | 1.23549E+00 | 1.87641E+00 |
| 6 | −7.60318E−03 | −3.99287E−03 | 1.07488E−02 | −2.89653E−02 |
| 7 | 1.65392E−01 | −1.64453E−01 | −4.44061E−02 | −1.28912E−01 |
| 8 | −1.16209E−01 | −6.39650E−02 | −8.72959E−01 | 3.09397E−01 |
| 9 | −3.72329E−02 | 3.31249E−02 | 1.03966E−01 | 1.15216E−01 |
| 10 | −4.28508E−01 | 2.79846E−01 | −6.84482E−02 | 4.12217E−02 |
| 13, 17 | 4.96952E−01 | 7.51785E−01 | 1.49283E−01 | 1.39339E+00 |
| 14, 16 | −2.34768E+00 | 1.11367E+00 | 2.41155E+00 | 1.90450E+00 |
| 15 | 6.47778E−01 | 1.81872E−02 | −4.44577E−03 | 4.28734E−02 |

Figure 10A:
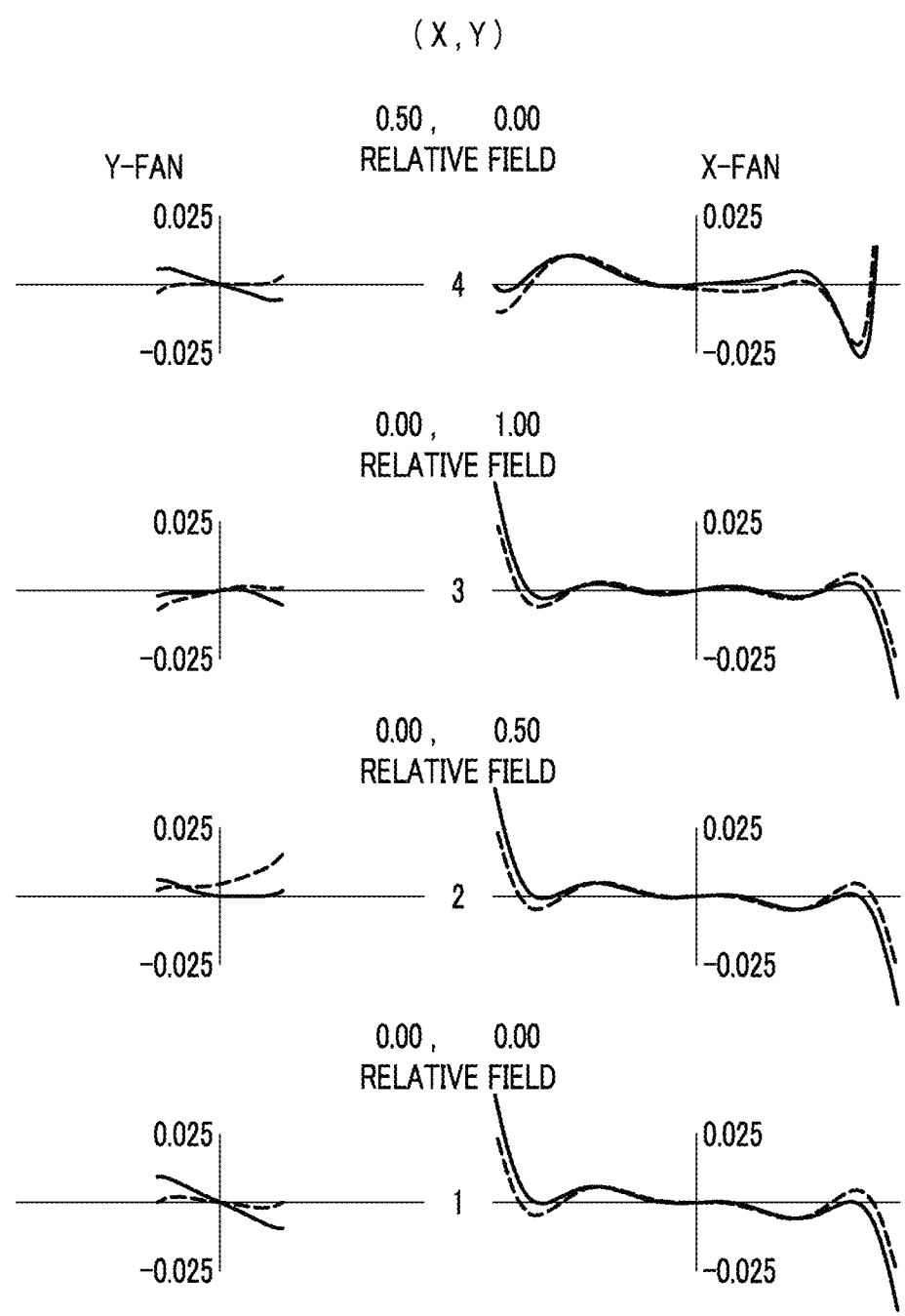
FIG. 10A is a lateral aberration diagram of the virtual image display device according to Numerical Example 2.

FIGS. 10A and 10B are lateral aberration diagrams of the virtual image display device 1A according to Numerical Example 2.

In Numerical Example 2 as well, the first optical portion OP1 having an anamorphic power forms the first magnification in the first direction and the second magnification in the second direction in the light guide 30. Thus, the light guide 30 can be made thinner. Numerical Example 2 also satisfies all of the above formulae (1) to (5) as described below.

Value of TLmax/Rmax: −0.68 (see formula (1))

Value of TLmin/Rmin: −0.33 (see formula (2))

Value of TLmin/TLmax: 0.52 (see formula (3))

Value of βmin/βmax: 0.88 (see formula (4))

Value of βmin: 1.37 (see formula (5))

In the virtual image display device 1A according to Numerical Example 2 as well, various aberrations are successfully corrected (see FIGS. 10A and 10B), a wide angle of view (for example, an angle of view exceeding 40 degrees in a diagonal direction) is obtained, and desired image quality is achieved. In addition, in the virtual image display device 1A according to Numerical Example 2 as well, various effects are obtained by satisfying the above-described formulae (1) to (5).

Numerical Example 3

FIGS. 11A and 11B are diagrams of the optical configuration of a virtual image display device 1A according to Numerical Example 3. As illustrated in FIGS. 11A and 11B, the virtual image display device 1A according to Numerical Example 3 does not include the single lenses L2. In Numerical Example 3, five partial reflectors 320 formed in a planar shape are included in the light guide 30.

In Numerical Example 3, the angles of view of the virtual image in the vertical direction, the horizontal direction, and the diagonal direction are 17.3 degrees, 28.9 degrees, and 34.1 degrees, respectively. The aperture stop a has a rectangular aperture of 1.0 mm in the y1-direction and 5.0 mm in the x1-direction.

Table 5 presents a specific numerical configuration of the virtual image display device 1A according to Numerical Example 3. In Numerical Example 3, the values of distance A to the five partial reflectors are 12 mm, 13 mm, 14 mm, 15 mm, and 16 mm in order from the partial reflector 320 closest to the second surface 330 among the five partial reflectors 320. In other words, the five partial reflectors 320 are disposed at equal intervals of 1 mm. Table 6 lists data for each aspherical surface according to Numerical Example 3.

In Numerical Example 3, the second surface 330 of the light guide 30 is a reflection surface that reflects the image light transmitted through the partial reflector 320 back to the partial reflector 320.

TABLE 5

Numerical Example 3

|  | Ry | Rx | D | Nd | ν d |  |  |
|---|---|---|---|---|---|---|---|
| 0 | ∞ | ∞ | 0.00 |  |  |  |  |
| 1 | ∞ | ∞ | 0.30 | 1.51633 | 64.14 |  | S-BSL7(OHARA) |
| 2 | ∞ | ∞ | 0.80 |  |  |  |  |
| 3* | 7.293 | −7.380 | 1.36 | 1.63200 | 23 |  | OKP4HT(Osaka Gas Chemicals) |
| 4* | 3.294 | 5.566 | 1.52 |  |  |  |  |
| 5* | 47.937 | 28.858 | 3.63 | 1.53100 | 56 |  | E48R(ZEON) |
| 6* | −19.724 | −7.485 | 5.99 |  |  |  |  |
| 7* | 3.659 | 5.799 | 2.65 | 1.53100 | 56 |  | E48R(ZEON) |
| 8* | 43.492 | −15.861 | 0.00 |  |  |  |  |
| 9 | STOP |  | 0.39 |  |  |  |  |
| 10* | −2.504 | 130.060 | 0.90 | 1.63200 | 23 |  | OKP4HT(Osaka Gas Chemicals) |
| 11* | −6.011 | 6.706 | 0.43 |  |  |  |  |
| 12* | 120.268 | 5.957 | 2.53 | 1.53100 | 56 |  | E48R(ZEON) |
| 13* | −4.077 | −23.881 | 0.30 |  |  |  |  |
| 14 | ∞ | ∞ | 37.00 | 1.53100 | 56 |  | E48R(ZEON) |
| 15* | −33.804 | −42.228 | A | 1.53100 | 56 | REFLECTION | E48R(ZEON) |
| 16 | ∞ | ∞ | 3.30 | 1.53100 | 56 | REFLECTION | E48R(ZEON) |
| 17 | ∞ | ∞ | 15.000 |  |  |  |  |

TABLE 6

Numerical Example 3

Conic coefficient

|  | Ky | Kx |
|---|---|---|
| 3 | 0.000 | 0.000 |
| 4 | 0.000 | 0.000 |
| 5 | 0.000 | 0.000 |
| 6 | −56.929 | −11.406 |
| 7 | 0.751 | −0.102 |
| 8 | 0.000 | 0.000 |
| 10 | 0.000 | 0.000 |

TABLE 6-continued

Numerical Example 3

| | | |
|---|---|---|
| 11 | 0.000 | 0.000 |
| 12 | −292.967 | 0.560 |
| 13 | 0.000 | 0.000 |
| 15 | 0.000 | 0.000 |

Rotational symmetry coefficient

| | $AR_4$ | $AR_6$ | $AR_8$ | $AR_{10}$ |
|---|---|---|---|---|
| 3 | −9.16833E−03 | 2.85687E−05 | 7.45172E−06 | −3.43737E−10 |
| 4 | −1.29126E−02 | 1.26525E−05 | −1.85831E−04 | 1.89301E−05 |
| 5 | −1.40887E−03 | 3.70392E−08 | −2.96121E−04 | 6.53424E−08 |
| 6 | −2.52313E−03 | 1.50391E−04 | −1.06850E−05 | 2.32247E−07 |
| 7 | 7.18750E−05 | −6.26413E−05 | −3.37204E−06 | −4.35367E−08 |
| 8 | −1.43478E−04 | −4.04819E−05 | 8.43663E−07 | 1.01250E−04 |
| 10 | −6.65868E−04 | −1.44345E−06 | 1.13479E−06 | 2.12897E−04 |
| 11 | 3.07672E−06 | −6.24423E−05 | −9.28174E−07 | −3.57756E−10 |
| 12 | −2.05319E−03 | −3.79664E−05 | −2.88095E−07 | −8.03168E−10 |
| 13 | 1.06905E−03 | 4.31995E−08 | −1.10909E−13 | 5.63771E−07 |
| 15 | −5.58376E−07 | −2.94573E−09 | 1.77413E−10 | −1.77399E−11 |

Rotational asymmetry coefficient

| | $AP_4$ | $AP_6$ | $AP_8$ | $AP_{10}$ |
|---|---|---|---|---|
| 3 | 8.68047E−01 | −8.82157E−01 | 1.55260E−01 | −5.08834E+00 |
| 4 | 7.31462E−01 | 3.47234E+00 | 1.26008E+00 | 1.21305E+00 |
| 5 | 9.56024E−01 | 5.18821E+00 | 9.81824E−01 | −5.47977E−01 |
| 6 | −2.20941E−02 | −4.56212E−02 | −3.43205E−02 | −1.11731E−01 |
| 7 | 2.98221E+00 | 2.83071E−01 | 1.76489E+00 | −2.19855E−01 |
| 8 | −5.88288E−01 | 1.74630E−01 | 2.03094E+00 | 1.30131E+00 |
| 10 | −3.37768E−02 | −9.76577E−02 | 2.54320E+00 | 1.31166E+00 |
| 11 | −1.08382E+01 | 1.66250E+00 | 2.44901E+00 | 4.42657E+00 |
| 12 | 2.77249E−01 | 1.60853E+00 | −2.08693E+00 | 5.59192E+00 |
| 13 | 1.12454E−01 | −4.47353E+00 | −7.47735E+01 | 1.33450E+00 |
| 15 | 2.15817E+00 | 2.46811E−01 | −2.05655E−01 | 4.74513E−01 |

Figure 12A:
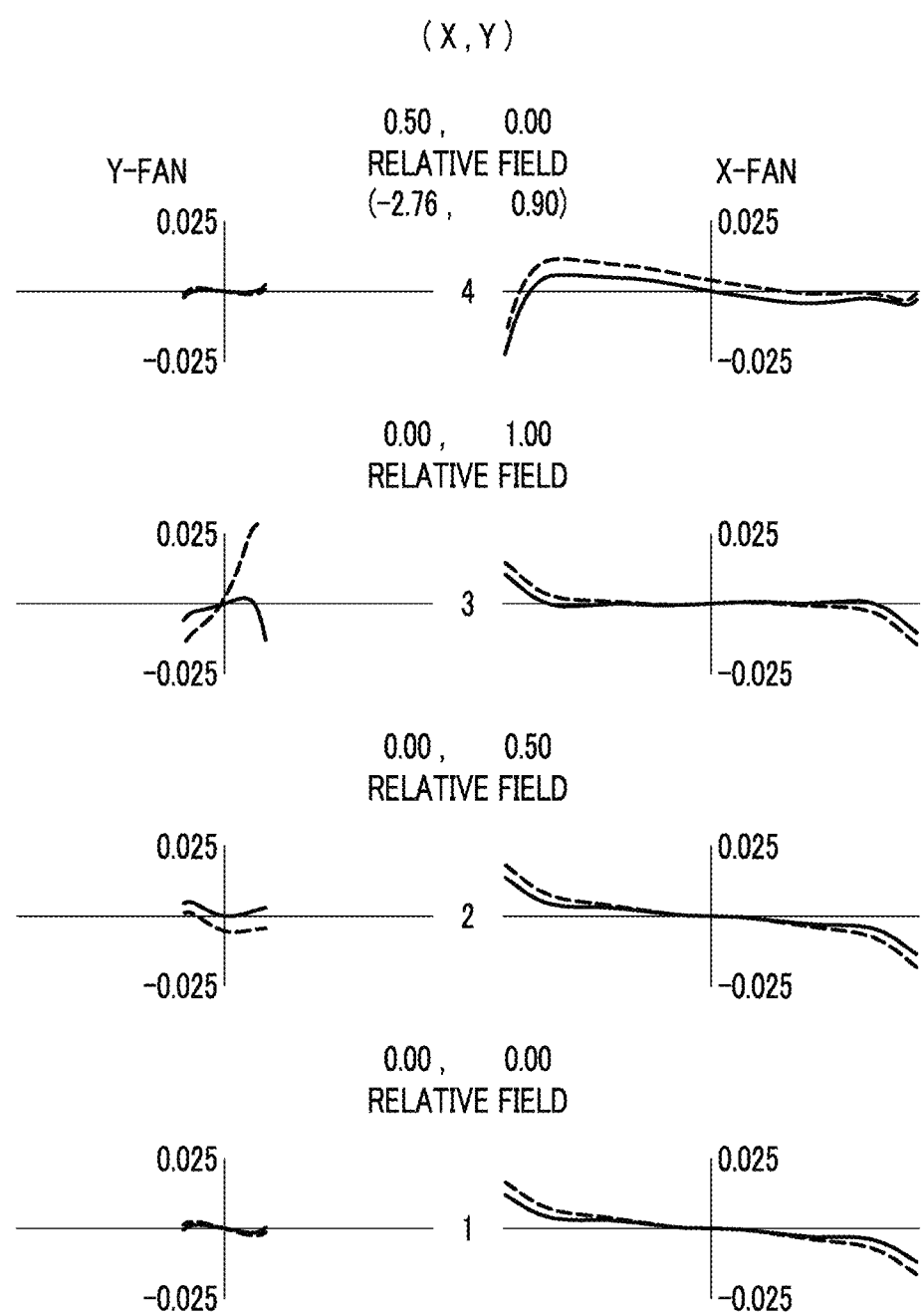
FIG. 12A is a lateral aberration diagram of the virtual image display device according to Numerical Example 3.

FIGS. 12A and 12B are lateral aberration diagrams of the virtual image display device 1A according to Numerical Example 3.

In Numerical Example 3 as well, the first optical portion OP1 having an anamorphic power forms the first magnification in the first direction and the second magnification in the second direction in the light guide 30. Thus, the light guide 30 can be made thinner. Numerical Example 3 also satisfies all of the above formulae (1) to (5) as described below.

Value of TLmax/Rmax: −0.50) (see formula (1))

Value of TLmin/Rmin: −0.50) (see formula (2))

Value of TLmin/TLmax: 0.80 (see formula (3))

Value of βmin/βmax: 0.83 (see formula (4))

Value of βmin: 0.97 (see formula (5))

In the virtual image display device 1A according to Numerical Example 3 as well, various aberrations are successfully corrected (see FIG. 12A and FIG. 12B), a wide angle of view (for example, an angle of view exceeding 30 degrees in a diagonal direction) is obtained, and desired image quality is achieved. In addition, in the virtual image display device 1A according to Numerical Example 3 as well, various effects are obtained by satisfying the above-described formulae (1) to (5).

Numerical Example 4

FIGS. 13A and 13B are diagrams of the optical configuration of a virtual image display device 1A according to Numerical Example 4. In Numerical Example 4, seven partial reflectors 320 formed in a planar shape are included in the light guide 30.

In Numerical Example 4, the angles of view of the virtual image in the vertical direction, the horizontal direction, and the diagonal direction are 20.3 degrees, 35.1 degrees, and 40.3 degrees, respectively. The aperture stop a has a rectangular aperture of 1.2 mm in the y1-direction and 6.3 mm in the x1-direction.

Table 7 presents a specific numerical configuration of the virtual image display device 1A according to Numerical Example 4. In Numerical Example 4, the values of distance A to the seven lenses are 13.5 mm, 15 mm, 16.5 mm, 18 mm, 19.5 mm, 21 mm, and 22.5 mm in order from the partial reflector 320 closest to the second surface 330 among the three partial reflectors 320. In other words, the seven partial reflectors 320 are disposed at equal intervals of 1.5 mm. Table 8 lists data for each aspherical surface according to Numerical Example 4.

In Numerical Example 4, the second surface of each of the single lenses L2 is a reflection surface that reflects the image light transmitted through the partial reflector 320 back to the partial reflector 320.

TABLE 7

Numerical Example 4

|   | Ry | Rx | D | Nd | νd | | |
|---|---|---|---|---|---|---|---|
| 0 | ∞ | ∞ | 0.00 | | | | |
| 1 | ∞ | ∞ | 0.30 | 1.51633 | 64.14 | | S-BSL7(OHARA) |
| 2 | ∞ | ∞ | 0.59 | | | | |
| 3* | 6.530 | 22.320 | 1.73 | 1.63200 | 23 | | OKP4HT(Osaka Gas Chemicals) |
| 4* | 3.246 | 280.124 | 1.38 | | | | |
| 5* | −31.029 | 16.468 | 3.36 | 1.53100 | 56 | | E48R(ZEON) |
| 6* | −9.468 | −7.522 | 6.61 | | | | |
| 7* | 11.414 | 5.875 | 3.18 | 1.53100 | 56 | | E48R(ZEON) |
| 8* | −10.222 | −15.693 | 0.00 | | | | |
| 9 | STOP | | 0.40 | | | | |
| 10* | −5.531 | 52.522 | 1.74 | 1.63200 | 23 | | OKP4HT(Osaka Gas Chemicals) |
| 11* | −39.219 | 7.382 | 1.52 | | | | |
| 12* | 5.055 | 6.614 | 36.85 | 1.53100 | 56 | | E48R(ZEON) |
| 13* | −4.454 | −52.866 | 3.23 | | | | |
| 14* | −4.735 | −20.169 | 1.83 | 1.53100 | 56 | | E48R(ZEON) |
| 15* | −32.544 | −32.497 | −1.83 | 1.53100 | 56 | REFLECTION | E48R(ZEON) |
| 16* | −4.735 | −20.169 | −3.23 | | | | |
| 17* | −4.454 | −52.866 | A | 1.53100 | 56 | | |
| 20 | ∞ | ∞ | 2.50 | 1.53100 | 56 | REFLECTION | E48R(ZEON) |
| 21 | ∞ | ∞ | 15.000 | | | | E48R(ZEON) |

TABLE 8

Numerical Example 4

Conic coefficient

|   | Ky | Kx |
|---|---|---|
| 3 | 0.000 | 9.999 |
| 4 | 0.000 | 0.000 |
| 5 | 0.000 | −1.295 |
| 6 | 0.000 | −10.000 |
| 7 | 0.000 | −0.356 |
| 8 | 0.000 | 0.908 |
| 10 | 0.000 | 0.000 |
| 11 | 0.000 | 0.000 |
| 12 | −0.002 | 0.448 |
| 13, 17 | −0.118 | −10.000 |
| 14, 16 | −0.326 | −0.573 |
| 15 | 0.000 | 0.000 |

Rotational symmetry coefficient

|   | $AR_4$ | $AR_6$ | $AR_8$ | $AR_{10}$ |
|---|---|---|---|---|
| 3 | −5.68867E−03 | −3.67284E−05 | 7.36635E−06 | 2.18885E−12 |
| 4 | −1.07425E−02 | −6.83768E−06 | −1.68913E−04 | 2.18195E−05 |
| 5 | −5.48610E−03 | −7.13323E−07 | −4.26915E−04 | 2.66936E−07 |
| 6 | −1.88835E−03 | 1.57502E−04 | −8.59569E−06 | 1.86345E−07 |
| 7 | −1.42162E−04 | 6.96359E−06 | 1.46152E−06 | 1.03539E−08 |
| 8 | −1.56642E−03 | 5.74929E−05 | −1.66532E−07 | −7.35400E−07 |
| 10 | −3.94421E−04 | 3.60865E−05 | −5.55894E−05 | 4.47342E−07 |
| 11 | −1.49633E−04 | 2.92645E−08 | −3.41254E−07 | 2.08716E−05 |
| 12 | −1.64074E−03 | 3.99864E−05 | −8.68886E−08 | 1.56386E−06 |
| 13, 17 | 2.64192E−08 | 1.72424E−05 | 8.77615E−11 | 2.55342E−08 |
| 14, 16 | −1.09471E−06 | 1.71718E−05 | 8.09089E−12 | 1.04617E−06 |
| 15 | −3.99691E−06 | −1.87723E−08 | 1.36114E−10 | −7.47956E−13 |

Rotational asymmetry coefficient

|   | $AP_4$ | $AP_6$ | $AP_8$ | $AP_{10}$ |
|---|---|---|---|---|
| 3 | 9.88264E−02 | −1.33917E+00 | −5.46888E−01 | 4.14889E+00 |
| 4 | 8.63572E−01 | −1.15705E+00 | 1.30357E+00 | 1.27506E+00 |
| 5 | 8.64028E−01 | 2.19965E+00 | 9.98951E−01 | 3.52449E−01 |
| 6 | −2.33670E−01 | −6.17486E−02 | 2.97047E−02 | 1.28270E−02 |
| 7 | −5.57110E−01 | 1.41447E+00 | 5.29158E−01 | −1.92727E−01 |
| 8 | 2.27069E−01 | 4.63820E−02 | 2.34387E+00 | 1.41719E+00 |
| 10 | −5.11826E−01 | 5.59441E−01 | 8.91075E−01 | 1.53492E+00 |
| 11 | 1.44347E+00 | 7.01291E+00 | 2.12954E+00 | 8.63319E−01 |
| 12 | 7.29653E−02 | 3.15222E−01 | −1.10600E+00 | 9.19727E−01 |

TABLE 8-continued

Numerical Example 4

| 13, 17 | 1.08077E+01 | 1.07349E+00 | −3.83537E−01 | 9.05125E−01 |
| 14, 16 | −1.20732E+00 | 8.91393E−01 | −1.37711E+00 | 1.02819E+00 |
| 15 | 5.12168E−01 | 4.39653E−02 | −8.47451E−02 | 7.21836E−02 |

Figure 14A:
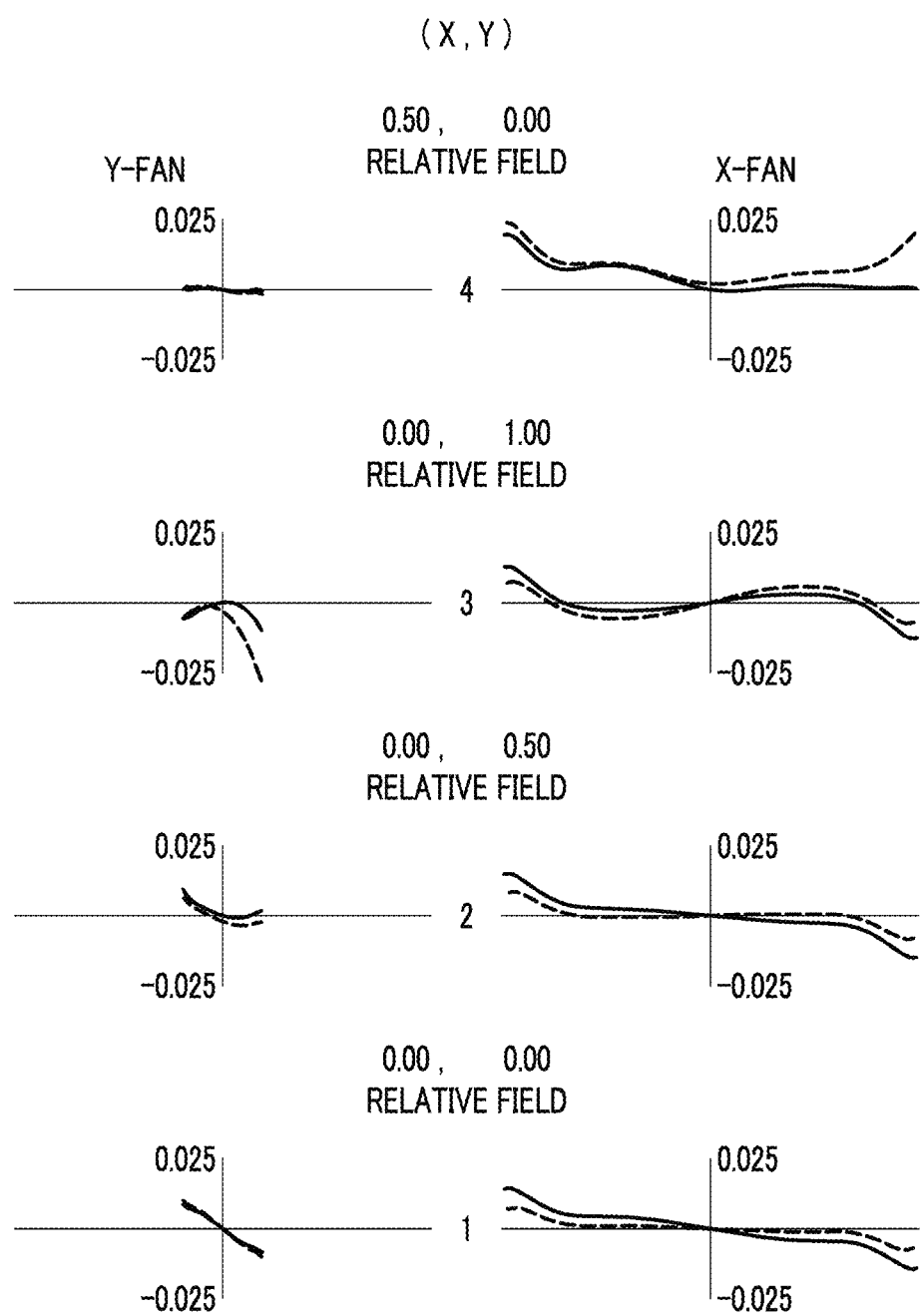
FIG. 14A is a lateral aberration diagram of the virtual image display device according to Numerical Example 4.

FIGS. 14A and 14B are lateral aberration diagrams of the virtual image display device 1A according to Numerical Example 4.

In Numerical Example 4 as well, the first optical portion OP1 having an anamorphic power forms the first magnification in the first direction and the second magnification in the second direction in the light guide 30. Thus, the light guide 30 can be made thinner. Numerical Example 4 also satisfies all of the above formulae (1) to (5) as described below.

Value of TLmax/Rmax: −0.71 (see formula (1))
Value of TLmin/Rmin: −0.25 (see formula (2))
Value of TLmin/TLmax: 0.35 (see formula (3))
Value of βmin/βmax: 0.78 (see formula (4))
Value of βmin: 1.36 (see formula (5))

In the virtual image display device 1A according to Numerical Example 4 as well, various aberrations are successfully corrected (see FIG. 14A and FIG. 14B), a wide angle of view (for example, an angle of view exceeding 40 degrees in a diagonal direction) is obtained, and desired image quality is achieved. In addition, in the virtual image display device 1A according to Numerical Example 4 as well, various effects are obtained by satisfying the above-described formulae (1) to (5).

The above is a description of exemplary embodiments of the present invention. The embodiments of the present invention are not limited to those described above, and various modifications are possible within the scope of the technical idea of the present invention. For example, the embodiments of the present application also include contents obtained by appropriately combining the embodiments explicitly described in the specification or the obvious embodiments.

In the above-described embodiments, the second optical portion OP2 also has an anamorphic power to return the aspect ratio of the image formed by the image display element 10, which has been changed by the anamorphic power of the first optical portion OP1, back to the original aspect ratio.

In another embodiment, the second optical portion OP2 may not have anamorphic power. For example, the aspect ratio of the image display element 10 is set to an appropriate aspect ratio (e.g., 16:9 or 4:3) by using the anamorphic power of the first optical portion OP1. This enables the wearer to visually recognize the virtual image with an appropriate aspect ratio set by the anamorphic power of the first optical portion OP without an anamorphic power of the second optical portion OP2.

The embodiments described above are given as an example, and unique advantageous effects are achieved for each of the following aspects given below.

Aspect 1
An optical system including: a first optical portion, on which image light from an image display element is incident; a light guide configured to guide the image light incident from the first optical portion; and a second optical portion configured to direct the image light guided in the light guide to an object. The first optical portion has an anamorphic surface having: a first shape in a first direction; and a second shape in a second direction different from the first direction, the first shape being different from the second shape. The first optical portion forms an intermediate image of the image light.

Aspect 2
In the optical system according to Aspect 1, the optical system according to claim 1,
wherein the second optical portion has an anamorphic surface.

Aspect 3
The optical system according to Aspect 1 or 2, further comprising a partial reflector between the first optical portion and the second optical portion, the partial reflector configured to: transmit the image light guided in the light guide, from a first side of the partial reflector, in which the first optical portion is disposed; and reflect the image light guided in the light guide, from a second side of the partial reflector to direct the image light to the object, the first side being different from the second side. The second optical portion reflects the image light transmitted through the partial reflector back to the partial reflector.

Aspect 4
The optical system according to Aspect 3, further includes multiple partial reflectors including the partial reflector. The multiple partial reflectors are spaced apart from each other in the optical axis direction.

Aspect 5
In the optical system according to Aspect 3 or 4, the second optical portion has a reflection surface that is an anamorphic surface that reflects the image light transmitted through the partial reflector back to the partial reflector.

Aspect 6
In the optical system according to Aspect 5, the optical system satisfies a formula:

$$-0.9 < TL\text{max}/R\text{max} < -0.3$$

where
TLmax is a distance (mm) between an image-forming position, at which the intermediate image is formed, and the reflection surface in an optical axis direction, in a cross-sectional plane in which an absolute value of a magnification of the intermediate image becomes maximum; and
Rmax is a paraxial radius of curvature of the reflection surface in the cross-sectional plane.

Aspect 7
In the optical system according to Aspect 5 or 6, the optical system satisfies a formula:

$$-0.7 < TL\text{min}/R\text{min} < -0.1$$

where
TLmin is a distance (mm) between an image-forming position, at which the intermediate image is formed, and the reflection surface in an optical axis direction in a cross-sectional plane in which an absolute value of a magnification of the intermediate image becomes minimum; and Rmin is a paraxial radius of curvature of the reflection surface in the cross-sectional plane.

Aspect 8

In the optical system according to any one of Aspect 5 to Aspect 7, the optical system satisfies a formula:

$$0.3 < TLmin/TLmax < 0.9$$

where

TLmax is a distance (mm) between an image-forming position, at which the intermediate image is formed, and the reflection surface in an optical axis direction in a cross-sectional plane in which an absolute value of a magnification of the intermediate image becomes maximum; and TLmin is a distance (mm) between the image-forming position and the reflection surface in a cross-sectional plane in which an absolute value of the magnification of the intermediate image becomes minimum.

Aspect 9

In the optical system according to any one of Aspect 1 to Aspect 8, the optical system satisfies a formula:

$$0.4 < \beta min/\beta max < 0.95$$

where

βmin is a minimum absolute value of a magnification of the intermediate image, and βmax is a maximum absolute value of the magnification of the intermediate image.

Aspect 10

In the optical system according to any one of Aspect 1 to Aspect 9, the optical system satisfies a formula:

$$0.5 < \beta min < 2.0$$

where

βmin is a minimum absolute value of a magnification of the intermediate image.

Aspect 11

In the optical system according to any one of Aspect 1 to Aspect 10, the first optical portion includes an aperture stop on an optical path of the image light.

Aspect 12

In the optical system according to any one of Aspect 1 to Aspect 11, the light guide has the lowest thickness in the first direction, and a magnification of the intermediate image in the first direction has the minimum absolute value.

Aspect 13

A virtual image display device includes: the optical system according to any one of Aspect 1 to Aspect 12; and the image display element configured to emit image light to the optical system.

Aspect 14

A head-up display includes the virtual image display device according to Aspect 13.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. An optical system, comprising:
a first optical portion, on which image light from an image display element is incident, the first optical portion having an anamorphic surface having:
a first shape in a first direction; and
a second shape in a second direction different from the first direction, the first shape being different from the second shape, the first optical portion to form an intermediate image of the image light;
a light guide to guide the image light incident from the first optical portion;
a second optical portion to direct the image light guided in the light guide to an object; and
a partial reflector between the first optical portion and the second optical portion, the partial reflector to:
transmit the image light guided in the light guide, from a first side of the partial reflector, in which the first optical portion is disposed; and
reflect the image light guided in the light guide, from a second side of the partial reflector to direct the image light to the object, the first side being different from the second side,
wherein the second optical portion reflects the image light transmitted through the partial reflector back to the partial reflector.

2. The optical system according to claim 1, further comprising multiple partial reflectors including the partial reflector,
wherein the multiple partial reflectors are spaced apart from each other in an optical axis direction.

3. The optical system according to claim 1,
wherein the second optical portion has a reflection surface that is an anamorphic surface that reflects the image light transmitted through the partial reflector back to the partial reflector.

4. The optical system according to claim 3,
wherein the optical system satisfies a formula:

$$-0.9 < TLmax/Rmax < -0.3$$

where

TLmax is a distance (mm) between an image-forming position, at which the intermediate image is formed, and the reflection surface in an optical axis direction, in a cross-sectional plane in which an absolute value of a magnification of the intermediate image becomes maximum; and Rmax is a paraxial radius of curvature of the reflection surface in the cross-sectional plane.

5. The optical system according to claim 3,
wherein the optical system satisfies a formula:

$$-0.7 < TLmin/Rmin < -0.1$$

where

TLmin is a distance (mm) between an image-forming position, at which the intermediate image is formed, and the reflection surface in an optical axis direction in a cross-sectional plane in which an absolute value of a magnification of the intermediate image becomes minimum; and Rmin is a paraxial radius of curvature of the reflection surface in the cross-sectional plane.

6. The optical system according to claim 3,
wherein the optical system satisfies a formula:

$$0.3 < TLmin/TLmax < 0.9$$

where

TLmax is a distance (mm) between an image-forming position, at which the intermediate image is formed, and the reflection surface in an optical axis direction in a cross-sectional plane in which an absolute value of a magnification of the intermediate image becomes maximum; and TLmin is a distance (mm) between the image-forming position and the reflection surface in a cross-sectional plane in which an absolute value of the magnification of the intermediate image becomes minimum.

7. The optical system according to claim 1, wherein the optical system satisfies a formula:

$$0.4<\beta min/\beta max<0.95$$

where

βmin is a minimum absolute value of a magnification of the intermediate image, and βmax is the maximum absolute value of the magnification of the intermediate image.

8. The optical system according to claim 1, wherein the optical system satisfies a formula:

$$0.5<\beta min<2.0$$

where

βmin is a minimum absolute value of a magnification of the intermediate image.

9. The optical system according to claim 1, wherein the first optical portion includes an aperture stop on an optical path of the image light.

10. A virtual image display device comprising:
the optical system according to claim 1; and
the image display element to emit image light to the optical system.

11. A head-up display comprising the virtual image display device according to claim 10.

12. An optical system, comprising:
a first optical portion, on which image light from an image display element is incident, the first optical portion having an anamorphic surface having:
a first shape in a first direction; and
a second shape in a second direction different from the first direction, the first shape being different from the second shape, the first optical portion configured to form an intermediate image of the image light;
a light guide configured to guide the image light incident from the first optical portion; and
a second optical portion configured to direct the image light guided in the light guide to an object,
wherein the second optical portion has an anamorphic surface.

13. The optical system according to claim 12, wherein:
the second optical portion has an anamorphic surface.

14. The optical system according to claim 12, wherein the optical system satisfies a formula:

$$0.4<\beta min/\beta max<0.95$$

where

βmin is a minimum absolute value of a magnification of the intermediate image, and βmax is a maximum absolute value of the magnification of the intermediate image.

15. The optical system according to claim 12, wherein the optical system satisfies a formula:

$$0.5<\beta min<2.0$$

where

βmin is a minimum absolute value of a magnification of the intermediate image.

16. The optical system according to claim 12, wherein:
the first optical portion includes an aperture stop on an optical path of the image light.

17. A virtual image display device comprising:
the optical system according to claim 12; and
the image display element to emit image light to the optical system.

18. A head-up display comprising the virtual image display device according to claim 17.

19. An optical system, comprising:
a first optical portion, on which image light from an image display element is incident, the first optical portion having an anamorphic surface having:
a first shape in a first direction; and
a second shape in a second direction different from the first direction, the first shape being different from the second shape, the first optical portion to form an intermediate image of the image light;
a light guide to guide the image light incident from the first optical portion; and
a second optical portion to direct the image light guided in the light guide to an object,
wherein:
the light guide has a lowest thickness in the first direction, and
a magnification of the intermediate image in the first direction has a minimum absolute value.

20. The optical system according to claim 19, wherein:
the second optical portion has an anamorphic surface.

* * * * *